(12) United States Patent
Miyoshi et al.

(10) Patent No.: US 10,108,405 B2
(45) Date of Patent: Oct. 23, 2018

(54) COMPILING APPARATUS AND COMPILING METHOD

(71) Applicant: FUJITSU LIMITED, Kawasaki-shi, Kanagawa (JP)

(72) Inventors: Takahiro Miyoshi, Numazu (JP); Shuichi Chiba, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 232 days.

(21) Appl. No.: 15/193,174

(22) Filed: Jun. 27, 2016

(65) Prior Publication Data

US 2017/0039044 A1 Feb. 9, 2017

(30) Foreign Application Priority Data

Aug. 3, 2015 (JP) .................. 2015-153450

(51) Int. Cl.
*G06F 8/41* (2018.01)
(52) U.S. Cl.
CPC ............ *G06F 8/4441* (2013.01); *G06F 8/443* (2013.01)
(58) Field of Classification Search
CPC ................. G06F 8/4441; G06F 8/443
USPC ........................................ 717/154
See application file for complete search history.

(56) References Cited

U.S. PATENT DOCUMENTS

| | | | | |
|---|---|---|---|---|
| 5,339,420 A * | 8/1994 | Hoxey | ............ | G06F 8/443 717/151 |
| 5,586,020 A * | 12/1996 | Isozaki | ............ | G06F 8/42 717/143 |
| 6,745,384 B1 * | 6/2004 | Biggerstaff | ............ | G06F 8/4441 712/203 |
| 2004/0039900 A1 | 2/2004 | Heishi et al. | | |
| 2007/0169039 A1 * | 7/2007 | Lin | ............ | G06F 8/34 717/146 |
| 2007/0174830 A1 * | 7/2007 | Gan | ............ | G06F 8/443 717/153 |
| 2015/0293768 A1 * | 10/2015 | Miyoshi | ............ | G06F 9/30058 712/226 |

FOREIGN PATENT DOCUMENTS

| | | |
|---|---|---|
| EP | 1094387 | 4/2001 |
| JP | 2-163831 | 6/1990 |
| JP | 8-087417 | 4/1996 |
| JP | 2001-117890 | 4/2001 |
| JP | 2001-265605 | 9/2001 |
| JP | 2004-21553 | 1/2004 |

* cited by examiner

*Primary Examiner* — Jason D Mitchell
(74) *Attorney, Agent, or Firm* — Fujitsu Patent Center

(57) ABSTRACT

A memory stores first code that compares a value of a variable with each of three or more comparison values, and that performs branch control in accordance with comparison results. A processor determines a minimum comparison value and a maximum comparison value among the comparison values. The processor converts the first code into second code that compares the value of the variable with the minimum comparison value and the maximum comparison value, and that performs the branch control without performing comparisons with the other comparison values when the value of the variable is less than the minimum comparison value or greater than the maximum comparison value.

5 Claims, 21 Drawing Sheets

PROCESSOR INFORMATION — 151

| INSTRUCTION | OPERATION CONTENT |
|---|---|
| cmp A, B | Z=1 if A=B<br>N=1 if A<B<br>V=1 if A-B<Min or A-B>Max |
| beq label | goto label if Z=1 |
| bne label | goto label if Z=0 |
| bl label | goto label if (N xor V)=1 |
| bg label | goto label if (not (Z or (N xor V)))=1 |
| bge label | goto label if (not (N xor V))=1 |
| ba label | goto label |

FIG. 6

CONTROL INFORMATION STORAGE UNIT — 125

COMPARISON VALUE VECTOR — 153

| INDEX | COMPARISON VALUE |
|---|---|
| 0 | 9 |
| 1 | 10 |
| 2 | 13 |
| 3 | 32 |
| 4 | 34 |
| 5 | 39 |
| 6 | 47 |
| 7 | 59 |
| 8 | 123 |
| 9 | 125 |

INTERVAL MAP — 154

| INTERVAL | COMPARISON VALUE |
|---|---|
| 63 | 59 |
| 18 | 13 |
| 11 | 47 |
| 7 | 39 |
| 4 | 34 |
| 2 | 10 |
| 1 | 32 |
| 1 | 123 |

INSTRUCTION TABLE — 155

| COMPARISON VALUE | INSTRUCTION TYPE |
|---|---|
| 39 | bge |
| 34 | ba |
| 13 | bge |
| 10 | ba |
| 59 | bge |
| 47 | ba |

```
L5:   load b, mem_adr
      cmp b, 0
      bne L13
L14:  cmp c, 9      } BOUNDARY DETERMINATION
      bl L12
L15:  cmp c, 125
      bg L12
L16:  cmp c, 60     } GAP DETERMINATION
      bl L18
L17:  cmp c, 123
      bl L12
L18:  cmp c, 39     } BRANCH POINT DETERMINATION
      bge L20
L19:  cmp c, 13
      bge L4
L3:   cmp c, 9
      beq L13
L1:   cmp c, 10
      beq L13
      ba L12
L4:   cmp c, 13
      beq L13
L2:   cmp c, 32
      beq L13
L6:   cmp c, 34
      beq L13
      ba L12
L20:  cmp c, 59     } BRANCH POINT DETERMINATION
      bge L9
L7:   cmp c, 39
      beq L13
L8:   cmp c, 47
      beq L13
      ba L12
L9:   cmp c, 59
      beq L13
L10:  cmp c, 123
      beq L13
L11:  cmp c, 125
      beq L13
L12:  // process X
L13:  // process Y
```

FIG. 11

COMPILING APPARATUS AND COMPILING METHOD

CROSS-REFERENCE TO RELATED APPLICATION

This application is based upon and claims the benefit of priority of the prior Japanese Patent Application No. 2015-153450, filed on Aug. 3, 2015, the entire contents of which are incorporated herein by reference.

FIELD

The embodiments discussed herein are related to a compiling apparatus and a compiling method.

BACKGROUND

In software development, it is often the case that source code is written in a high-level language easily understood by humans, and is converted into machine-readable object code by a compiler. When converting (compiling) source code into object code, the compiler performs various types of optimization in order to improve the execution efficiency of the object code. Optimization involves, for example, removing redundant instructions, changing the order in which instructions are executed, reducing the number of instructions by use of special instructions, parallelization using a parallel processing processor, and the like.

Source code often contains a plurality of successive comparison operations. For example, there is source code that determines whether the value of a certain variable matches any one of a plurality of comparison values, and starts a predetermined process if the value of the variable matches any one of the comparison values. In the case where such source code is simply compiled, the resulting object code is likely to contain, for each of the comparison values, a comparison instruction that compares the value of the variable with the comparison value, and a branch instruction that causes a jump to a predetermined instruction if the comparison result is true. That is, in the case where branch control is performed in accordance with the result of a plurality of comparison operations, a high load is likely to be placed on the processor. To prevent such a situation, some compilers perform optimization of comparison operations and branch control.

For example, there has been proposed a compiler that generates object code containing a small number of comparison instructions from source code describing a plurality of successive comparison operations. The proposed compiler detects, from intermediate code converted from source code, a comparison instruction #1 that compares data A and data C. Further, the compiler detects a comparison instruction #2 that compares data B to be stored in a memory area continuous with the data A, and data D to be stored in a memory area continuous with the data C. The compiler merges the detected comparison instructions #1 and #2 into one comparison instruction by expanding the range of data to be compared at one time.

There has also been proposed a compiler that generates object code which executes an instruction at the jump target of a branch instruction in advance using a parallel processing processor, and which discards the result of the advance execution if the value of a conditional expression is false. The proposed compiler calculates the probability that the value of the conditional expression is true, by performing a test run of the object code. If the probability that the value of the conditional expression is false is higher, the compiler inverts the conditional expression and switches the jump target of the branch instruction. Thus, the instruction supposed to be executed if the value of the original conditional expression is false is executed by the parallel processing processor in advance. This makes it possible to reduce the probability that the result of the advance execution is discarded.

There has also been proposed a compiler that reduces the number of branch instructions contained in object code. The proposed compiler detects a comparison instruction #1, and a branch instruction #1 that causes a jump to a predetermined instruction if the result of the comparison instruction #1 is false, from intermediate code converted from source code. The compiler also detects a comparison instruction #2, and a branch instruction #2 that causes a jump to the same instruction as that of the branch instruction #1 if the result of the comparison instruction #2 is false. The compiler replaces the branch instructions #1 and #2 with a logical instruction that calculates the logical AND of the result of the comparison instruction #1 and the result of the comparison instruction #2 and a branch instruction #3 that causes a jump to the predetermined instruction if the logical AND is false.

Further, there has been proposed a processor that determines whether to execute or invalidate an instruction located after a plurality of comparison instructions, based on a Boolean value stored in a condition flag register. When a comparison instruction #1 is input, the proposed processor stores a comparison result of the comparison instruction #1 in the condition flag register. When a comparison instruction #2 is input following the comparison instruction #1, the processor calculates the logical AND of the Boolean value registered in the condition flag register and the comparison result of the comparison instruction #2, and stores the logical AND in the condition flag register. After that, when an instruction other than a comparison instruction is input, the processor refers to the condition flag register, and invalidates the input instruction if the condition flag register is false. There has also been proposed a compiler that generates object code not including a branch instruction, using the functions of the above processor.

See, for example, Japanese Laid-open Patent Publications No. 02-163831, No. 2001-117890, No. 2001-265605, and No. 2004-21553.

As described above, there is source code that compares the value of a variable with each of a plurality of comparison values, and performs branch control in accordance with the comparison results. In some cases, when the result of a comparison with a certain comparison value is true, comparisons with the subsequent comparison values do not need to be performed. Thus, one method of compiler optimization for comparison operations may be to rearrange the order in which a plurality of comparison values are compared, and perform comparisons with comparison values in descending order of probability that the comparison result is true. The probability that the comparison result is true is calculated for each comparison value by executing a test run of the object code, for example.

However, there is room for improving the method of rearranging the order in which a plurality of comparison values are compared, in terms of reducing the load of the comparison process. For example, when it is likely that the value of the variable does not match any of a plurality of comparison values, comparisons might be made for all the plurality of comparison values. Thus, it is desired to reduce the average number of comparisons per value of a variable during execution.

SUMMARY

According to one aspect of the invention, there is provided a compiling apparatus that includes: a memory configured to store first code that compares a value of a variable with each of three or more comparison values, and performs branch control in accordance with comparison results; and a processor configured to perform a procedure including: determining a minimum comparison value and a maximum comparison value among the three or more comparison values, and converting the first code into second code that compares the value of the variable with the minimum comparison value and the maximum comparison value, and performs the branch control without performing comparisons with other comparison values of the three or more comparison values when the value of the variable is less than the minimum comparison value or greater than the maximum comparison value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of processor information;

FIG. 9 illustrates examples of a comparison value vector, an interval map, and an instruction table;

FIG. 11 illustrates an example of an optimized program;

DESCRIPTION OF EMBODIMENTS

Figure 1:
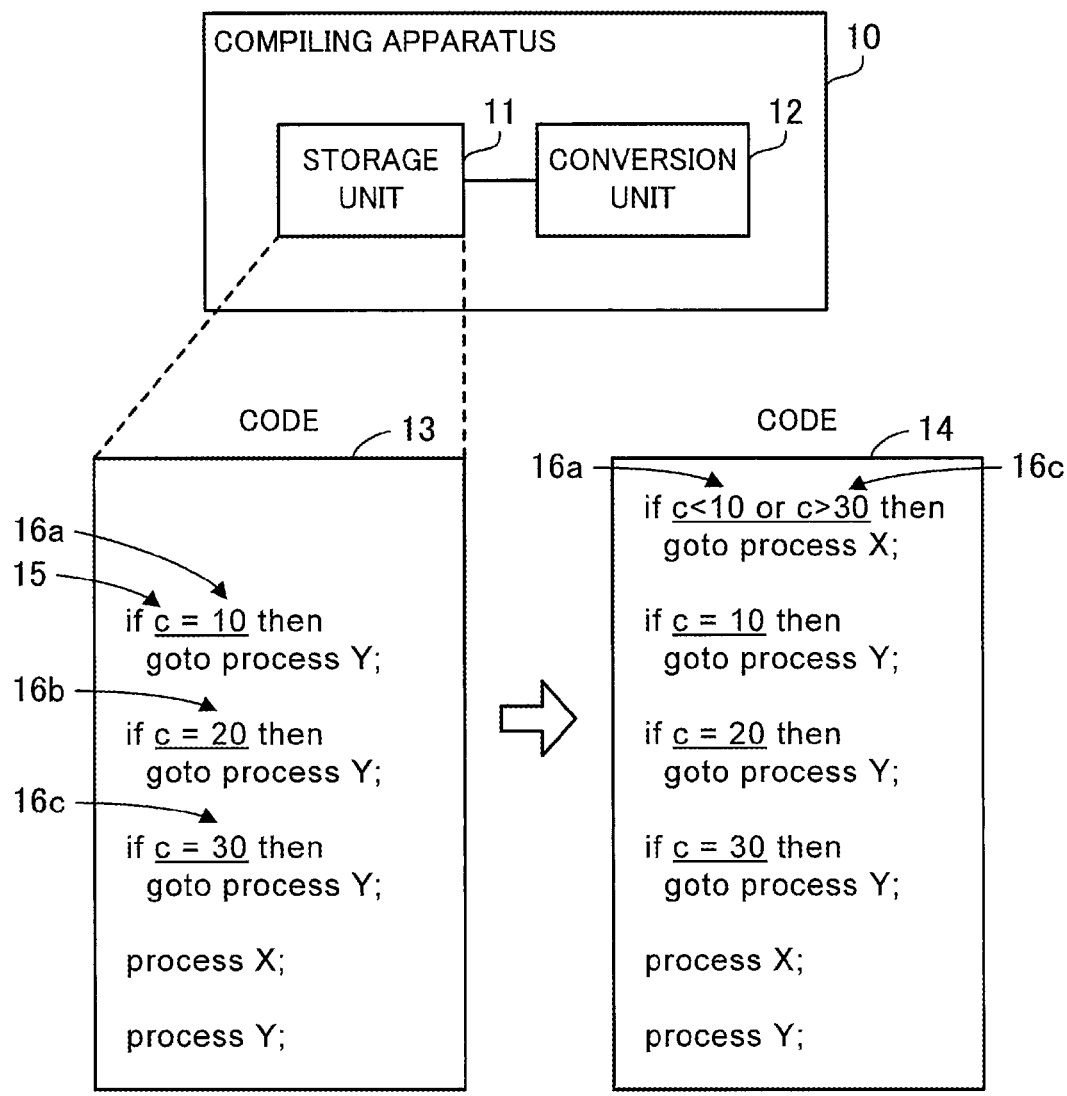
FIG. 1 illustrates a compiling apparatus according to a first embodiment.

Several embodiments will be described below with reference to the accompanying drawings, wherein like reference numerals refer to like elements throughout.

(a) First Embodiment

The following describes a first embodiment.

FIG. 1 illustrates a compiling apparatus 10 according to a first embodiment.

The compiling apparatus 10 of the first embodiment converts (compiles) source code written in a high-level language into machine-readable object code. Upon compilation, the compiling apparatus 10 performs optimization to improve the execution efficiency of the object code.

As will be described below, the compiling apparatus 10 converts code 13 into code 14. Each of the code 13 and code 14 may be regarded as a description of instructions to be executed by a processor, or may be regarded as a program. Each of the code 13 and code 14 may be source code, or may be intermediate code converted from source code. Alternatively, each of the code 13 and code 14 may be assembly code written in an assembly language, or may be object code. The compiling apparatus 10 may be a terminal apparatus operated by the user, or may be a server apparatus accessed by a terminal apparatus. The compiling apparatus 10 may be implemented by a computer.

The compiling apparatus 10 includes a storage unit 11 and a conversion unit 12. The storage unit 11 stores the code 13. The storage unit 11 may be a volatile storage device such as a random access memory (RAM) and the like, or may be a non-volatile storage device such as a hard disk drive (HDD) and the like. The conversion unit 12 converts the code 13 stored in the storage unit 11 into the code 14. The conversion unit 12 may store the code 14 in the storage unit 11. The conversion unit 12 may be a processor such as a central processing unit (CPU), a digital signal processor (DSP), and the like. The conversion unit 12 may include an application specific electronic circuit such as an application specific integrated circuit (ASIC), a field programmable gate array (FPGA), and the like. The processor executes a compiler program stored in the storage unit 11 or another storage device, for example. Note that a set of multiple processors (a multiprocessor) may be referred to as a "processor".

The code 13 describes comparison operations that compare the value of a variable 15 and three or more comparison values including comparison values 16a, 16b, and 16c. The code 13 also describes branch control in accordance with the comparison results. For example, the variable 15 is of the integer type; the comparison value 16a is "10"; the comparison value 16b is "20"; and the comparison value 16c is "30". Note that since characters may be represented by integers as character codes, the variable 15 may be of the character type.

The code 13 includes, for example, a first comparison instruction that compares the value of the variable 15 with the comparison value 16a, and a first branch instruction that causes a jump to a process Y when the first comparison result is true (the values match). The code 13 further includes, for example, a second comparison instruction that compares the value of the variable 15 with the comparison value 16b, and a second branch instruction that causes a jump to the process Y when the second comparison result is true (the values match). The code 13 further includes, for example, a third comparison instruction that compares the value of the variable 15 with the comparison value 16c, and a third branch instruction that causes a jump to the process Y when the third comparison result is true (the values match).

The three comparison instructions described above have the same value (value of the variable 15) for one of the compared values, and have different values (comparison values 16a, 16b, and 16c) for the other one of the compared values. Further, the three branch instructions described above specify the same process (process Y) as the jump target in the case where the comparison result is true. If all the three comparison results are false, a process X is executed. This indicates that the process Y is executed if the value of the variable 15 is any of "10", "20", and "30", and the process X is executed otherwise.

The conversion unit 12 detects, from the code 13, an instruction group that compares the value of the variable 15 with each of three or more comparison values and performs branch control. The conversion unit 12 determines a minimum comparison value and a maximum comparison value among the three or more comparison values. The minimum comparison value may be greater than the lower limit of the range of values that the variable 15 may take (the range of the variable 15). Further, the maximum comparison value may be less than the upper limit of the range of the variable 15. Among the comparison values 16a, 16b, and 16c, the comparison value 16a is the minimum comparison value, and the comparison value 16c is the maximum comparison value, for example. The conversion unit converts the code 13 into the code 14 based on the determined minimum comparison value and maximum comparison value.

The code 14 describes comparison operations that compare the value of the variable 15 with the minimum comparison value and with the maximum comparison value. The code 14 also describes branch control that bypasses at least comparisons with values other than the minimum comparison value and the maximum comparison value when the value of the variable 15 is less than the minimum comparison value or greater than the maximum comparison value. The determination of whether the value of the variable 15 is less than the minimum comparison value or greater than the maximum comparison value is inserted before the individual comparison operations between the value of the variable 15 and each comparison value described in the code 13, for example.

The code 14 includes, for example, a first additional comparison instruction that compares the value of the variable 15 with the minimum comparison value 16a, and a first additional branch instruction that causes a jump to the process X when the value of the variable 15 is less than the comparison value 16a. The code 14 also includes, for example, a second additional comparison instruction that compares the value of the variable 15 with the maximum comparison value 16c, and a second additional branch instruction that causes a jump to the process X when the value of the variable 15 is greater than the comparison value 16c. The code 14 also includes, for example, three comparison instructions and three branch instructions for the comparison values 16a, 16b, and 16c, which are the same as those included in the code 13, after these additional comparison instructions and additional branch instructions.

If the value of the variable 15 is less than the minimum comparison value, it is obvious that the value of the variable 15 does not match any of the three or more comparison values. Accordingly, in this case, a jump may be made to the process X without performing individual comparisons between the value of the variable 15 and each of the three or more comparison values. Further, if the value of the variable 15 is greater than the maximum comparison value, it is obvious that the value of the variable 15 does not match any of the three or more comparison values. Accordingly, in this case as well, a jump may be made to the process X without performing individual comparisons between the value of the variable 15 and each of the three or more comparison values.

It may be considered that, in the code 14, a path (an execution path) that jumps to the process X by bypassing (without performing) the individual comparisons with the three or more comparison values is inserted before the individual comparisons. On the other hand, if the value of the variable 15 is greater than or equal to the minimum comparison value and less than or equal to the maximum comparison value, it is likely that the value of the variable 15 matches one of the three or more comparison values. Accordingly, in this case, at least one or more of individual comparisons with the three or more comparison values may be performed.

According to the compiling apparatus 10 of the first embodiment, the minimum comparison value and the maximum comparison value among three or more comparison values that are compared with the value of the same variable 15 are determined from the code 13. Then, when the value of the variable 15 is less than the minimum comparison value or greater than the maximum comparison value, the code 13 is converted into the code 14 such that comparisons with the other comparison values are not performed.

Accordingly, if the value of the variable 15 is less than the minimum comparison value or greater than the maximum comparison value, the subsequent comparison instructions are not executed, so that the average number of comparisons per value of the variable 15 during execution is reduced. Therefore, it is possible to reduce the load of the comparison process for three or more comparison values. This is especially effective when the range of the variable 15 is large compared to the number of comparison values and thus it is likely that the value of the variable 15 does not match any of the comparison values. Further, this is especially effective when there are a large number of comparison values and thus a high load is placed by a comparison process of comparing the value of the variable 15 with all the comparison values.

For example, in the case where the comparison values are simply sorted in descending order of probability that the comparison result is true, if the value of the variable 15 does not match any of the comparison values, the value of the variable 15 is compared with all the comparison values. Further, if the difference in probability of being true is small (the probability does not vary greatly) among the comparison values, it is difficult to reduce the number of comparisons. On the other hand, in the code 14, it is possible to reduce the number of comparisons even when the value of the variable 15 does not match any of the comparison values. Further, the compiling apparatus 10 does not need to calculate the probability that the comparison result is true. Therefore, it is possible to reduce the cost of executing a test run of the object code and the cost of compilation.

Further, since the number of comparisons per value of the variable 15 is reduced, the number of times a branch instruction is executed may be reduced. Furthermore, since the number of times a branch instruction is executed is reduced, it is possible to reduce the cost (penalty) of re-execution due to a branch misprediction. Accordingly, it is possible to improve the execution efficiency of the object code. This is especially effective for processors with low branch prediction accuracy.

(b) Second Embodiment

The following describes a second embodiment.

Figure 2:
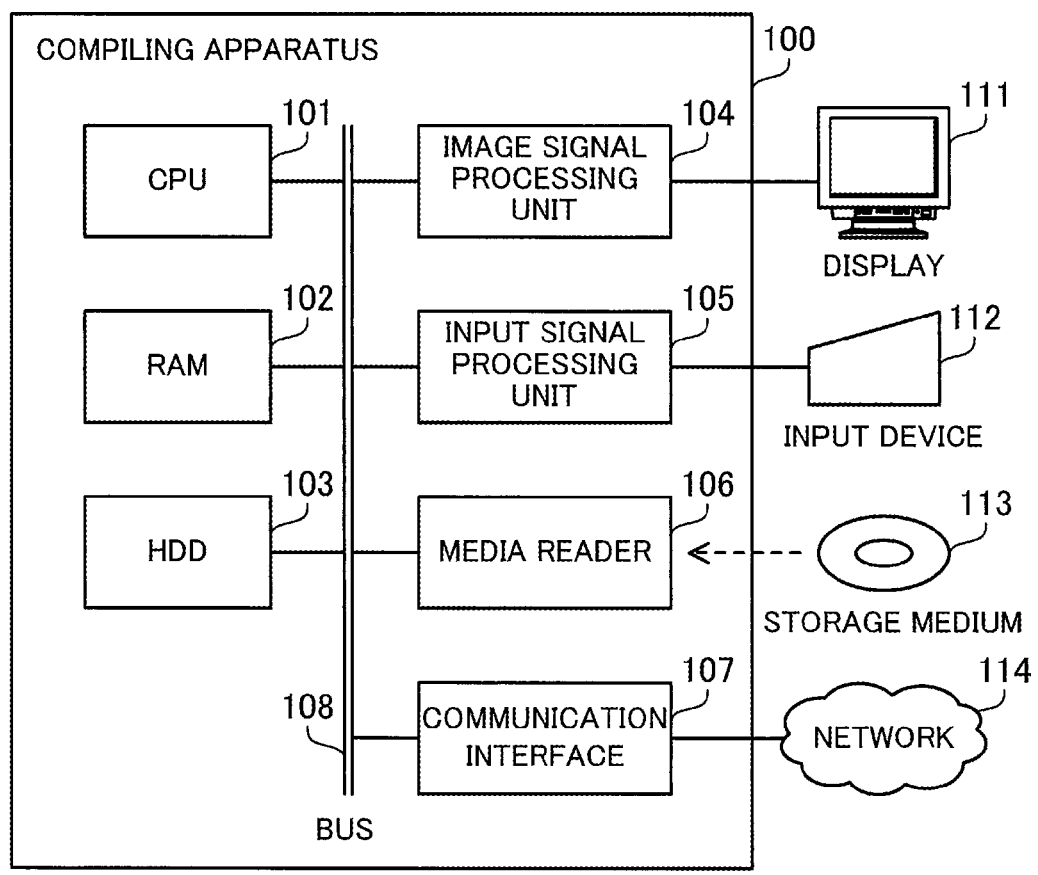
FIG. 2 is a block diagram illustrating exemplary hardware of a compiling apparatus.

FIG. 2 is a block diagram illustrating exemplary hardware of a compiling apparatus 100.

The compiling apparatus 100 includes a CPU 101, a RAM 102, an HDD 103, an image signal processing unit 104, an input signal processing unit 105, a media reader 106, and a communication interface 107. The CPU 101, the RAM 102, the HDD 103, the image signal processing unit 104, the input signal processing unit 105, the media reader 106, and the communication interface 107 are connected to a bus 108. The compiling apparatus 100 corresponds to the compiling apparatus 10 of the first embodiment. The CPU 101 corresponds to the conversion unit 12 of the first embodiment. The RAM 102 and the HDD 103 correspond to the storage unit 11 of the first embodiment.

The CPU 101 is a processor including an arithmetic circuit that executes instructions in a program. The CPU 101 loads at least part of a program and data stored in the HDD 103 to the RAM 102, and executes the program. Note that the CPU 101 may include multiple processor cores, and the compiling apparatus 100 may include multiple processors. Thus, operations described below may be executed in parallel by using multiple processors or processor cores. A set of multiple processors (a multiprocessor) may be referred to as a "processor".

The RAM 102 is a volatile semiconductor memory that temporarily stores a program executed by the CPU 101 and data used for operations by the CPU 101. The compiling apparatus 100 may include other types of memories than a RAM, and may include a plurality of memories.

The HDD 103 is a non-volatile storage device that stores software programs (such as an operation system (OS), middleware, application software, and the like) and data. The programs include a compiler program. The compiling apparatus 100 may include other types of storage devices such as a flash memory, a solid state drive (SSD), and the like, and may include a plurality of non-volatile storage devices.

The image signal processing unit 104 outputs an image to a display 111 connected to the compiling apparatus 100, in accordance with an instruction from the CPU 101. Examples of the display 111 include a cathode ray tube (CRT) display, a liquid crystal display (LCD), a plasma display, an organic electro-luminescence (OEL) display, and the like.

The input signal processing unit 105 receives an input signal from an input device 112 connected to the compiling apparatus 100, and outputs the input signal to the CPU 101. Examples of the input device 112 include a pointing device (such as a mouse, a touch panel, a touch pad, a trackball, and the like), a keyboard, a remote controller, a button switch, and the like. A plurality of types of input devices may be connected to the compiling apparatus 100.

The media reader 106 is a reading device that reads a program and data stored in a storage medium 113. Examples of the storage medium 113 include a magnetic disc (such as a flexible disk (FD), an HDD, and the like), an optical disc (such as a compact disc (CD), a digital versatile disc (DVD), and the like), a magneto-optical disc (MO), a semiconductor memory, and the like. The media reader 106 reads, for example, a program and data from the storage medium 113, and stores the read program and data in the RAM 102 or the HDD 103.

The communication interface 107 is connected to a network 114, and communicates with other apparatuses via the network 114. The communication interface 107 may be a wired communication interface connected to a communication apparatus such as a switch via a cable, or may be a radio communication interface connected to a base station via a radio link.

The compiling apparatus 100 may be a terminal apparatus operated by the user, or may be a server apparatus accessed by a terminal apparatus or another server apparatus via the network 114. The compiling apparatus 100 does not have to include the media reader 106. If the compiling apparatus 100 is controllable from a terminal apparatus operated by the user, the compiling apparatus 100 does not have to include the image signal processing unit 104 or the input signal processing unit 105. Further, the display 111 and the input device 112 may be integrated with the housing of the compiling apparatus 100.

Figure 3:
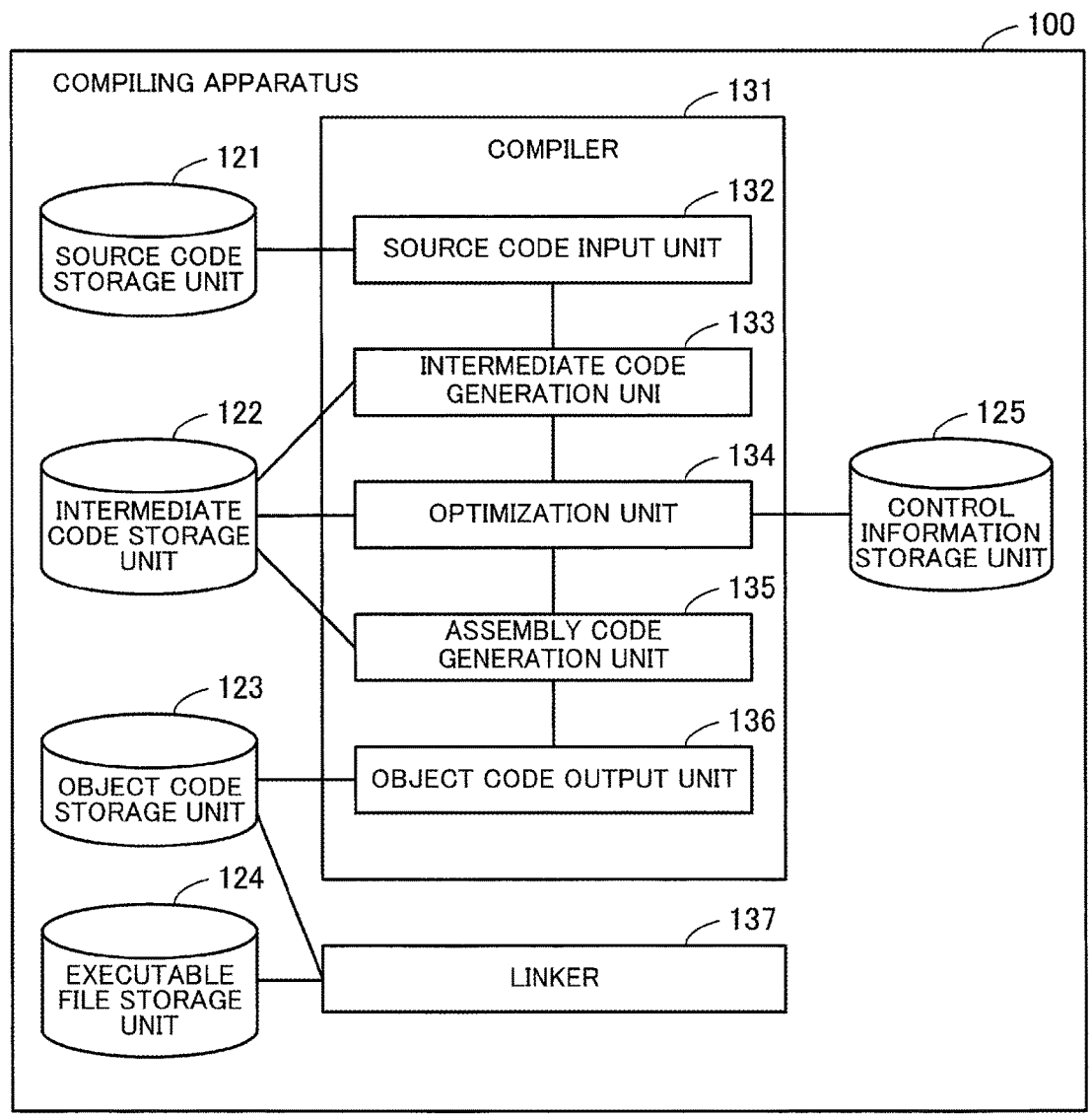
FIG. 3 is a block diagram illustrating exemplary functions of the compiling apparatus.

FIG. 3 is a block diagram illustrating exemplary functions of the compiling apparatus 100.

The compiling apparatus 100 includes a source code storage unit 121, an intermediate code storage unit 122, an object code storage unit 123, an executable file storage unit 124, a control information storage unit 125, a compiler 131, and a linker 137. The source code storage unit 121, the intermediate code storage unit 122, the object code storage unit 123, the executable file storage unit 124, and the control information storage unit 125 may be implemented using a storage area reserved in the RAM 102 or the HDD 103. The compiler 131 and the linker 137 may be implemented using programs (a compiler program and a linker program) executed by the CPU 101. Alternatively, the compiler 131 and the linker 137 may be implemented using an application specific electronic circuit.

The source code storage unit 121 stores source code. The source code is a program written in a high-level language such as C language. The user may directly enter source code in the compiling apparatus 100 using the input device 112 or the like, or may transmit source code to the compiling apparatus 100 via the network 114. The intermediate code storage unit 122 stores intermediate code. The intermediate code is a program written in an intermediate language used in the compiling apparatus 100, and corresponds to the source code.

The object code storage unit 123 stores object code. The object code is a program written in a machine language understandable by the processor, and corresponds to the source code and intermediate code. The executable file storage unit 124 stores an executable file. The executable file is a program executable by the CPU, and includes object code and links to libraries and the like. Note that the executable file may be executed by the CPU 101, another CPU of the compiling apparatus 100, or a CPU of a computer other than the compiling apparatus 100. The compiler 131 changes instructions to be used in the object code in accordance with the target CPU architecture. The control information storage unit 125 stores various types of control information used for optimization by the compiler 131. The details of the control information will be described below.

The compiler 131 converts source code into object code. The compiler 131 includes a source code input unit 132, an intermediate code generation unit 133, an optimization unit 134, an assembly code generation unit 135, and an object code output unit 136.

The source code input unit 132 receives a compile command from the user, and reads source code specified in the compile command from the source code storage unit 121. The intermediate code generation unit 133 analyzes the source code read by the source code input unit 132, and converts the source code into intermediate code. The analysis of source code includes so-called front-end processing such as lexical analysis, syntactic analysis, semantic analysis, and the like. The intermediate code generation unit 133 stores the generated intermediate code in the intermediate code storage unit 122.

The optimization unit 134 performs various type of optimization on the intermediate code stored in the intermediate code storage unit 122 in order to improve the execution speed. The optimization unit 134 analyzes the intermediate code, and rewrites the intermediate code in accordance with predetermined rules. The optimization includes instruction conversion in accordance with the target CPU architecture (type of the CPU by which the object code is to be executed). The target CPU architecture may be determined in advance, or may be specified by the user as an option in the compile command. The details of optimization will be described below.

The assembly code generation unit 135 reads the optimized intermediate code from the intermediate code storage unit 122, and converts the intermediate code into assembly code written in an assembly language, which is a low-level language. The object code output unit 136 converts the assembly code generated by the assembly code generation unit 135 into object code. Instructions in the assembly code and instructions in the object code always have one-to-one correspondence. The object code output unit 136 stores the generated object code in the object code storage unit 123.

The linker 137 reads the object code from the object code storage unit 123, and detects other object code and libraries that are referenced by the object code. The linker 137 links the read object code with the detected other object code and libraries so as to generate an executable file. The linker 137 stores the generated executable file in the executable file storage unit 124. The compiling function of the compiler 131 and the link function of the linker 137 may be integrated into a single module.

Figure 4:
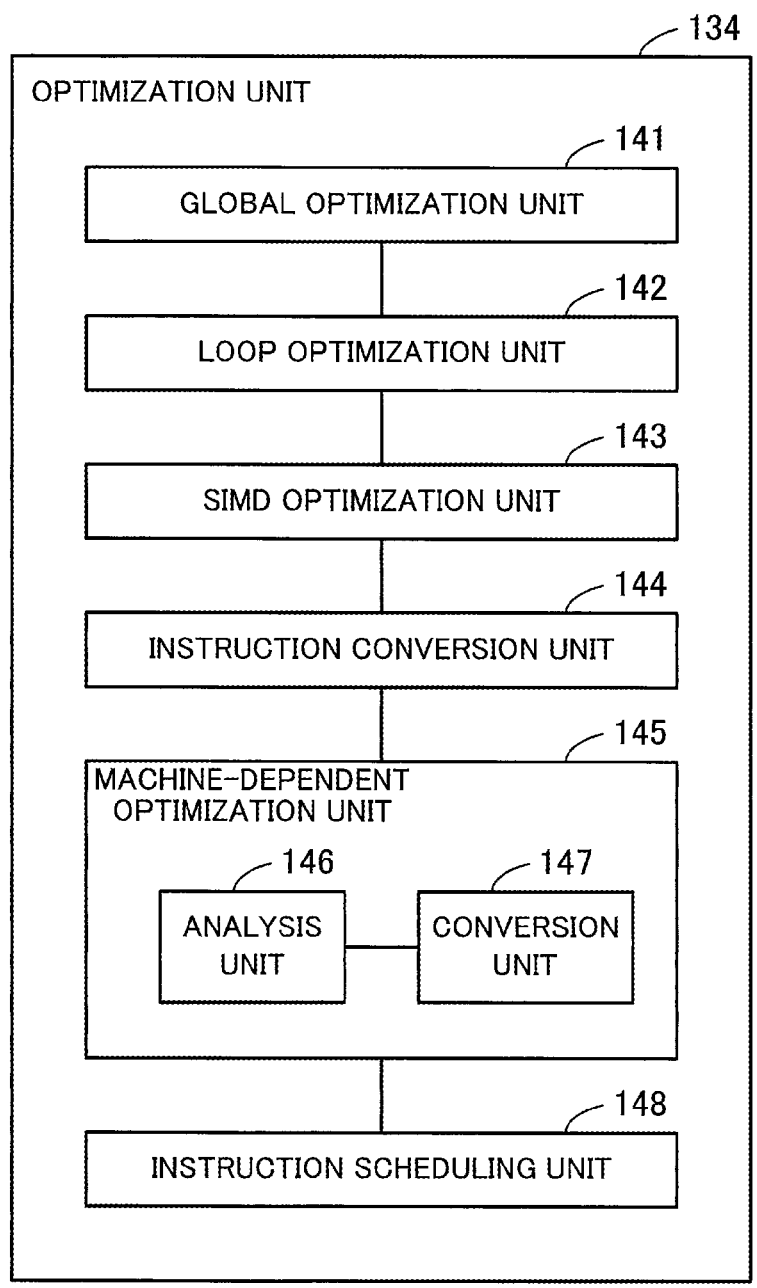
FIG. 4 is a block diagram illustrating exemplary functions of an optimization unit.

FIG. 4 is a block diagram illustrating exemplary functions of the optimization unit 134.

The optimization unit 134 includes a general optimization unit 141, a loop optimization unit 142, a single instruction multiple data (SIMD) optimization unit 143, an instruction conversion unit 144, a machine-dependent optimization unit 145, and an instruction scheduling unit 148.

The general optimization unit 141 performs general optimization on intermediate code. For example, the general optimization includes: removing variables that are not used; converting computation expressions dependent only on statically-determined values into constant subexpression shared by a plurality of computation expressions; and the like.

The loop optimization unit 142 detects a loop in the intermediate code, and performs optimization on the loop. The loop optimization includes, for example, moving an operation out of a loop if the operation produces the same value in every loop iteration. The loop optimization also includes, for example, expanding (unrolling) instructions in a loop and breaking down the instructions into an instruction indicating an operation in an i-th iteration (i is a positive integer) and an instruction indicating an operation in an (i+1)-th iteration so as to reduce the number times the loop iterates.

In the case where the target CPU architecture supports SIMD instructions, the SIMD optimization unit 143 detects, from the intermediate code, a set of two or more instructions that may be converted into a SIMD instruction. A set of instructions that may be converted into a SIMD instruction is a set of independent scalar instructions (non-SIMD instructions) indicating the same type of operation. A SIMD instruction is an instruction that performs the same type of operation on different pieces of data in parallel. The SIMD optimization unit 143 merges the detected set of two or more instructions into a SIMD instruction so as to reduce the number of instructions in the intermediate code.

The instruction conversion unit 144 converts the instruction format used in the intermediate code into an instruction format of an instruction set supported by the target CPU architecture. That is, the instruction conversion unit 144 converts the intermediate code independent of the CPU into intermediate code dependent on the CPU. The instruction conversion unit 144 may support only one CPU architecture, or may support a plurality of CPU architectures. In the latter case, the target CPU architecture is specified by the user, for example. The compiler 131 may hold processor information indicating an instruction set supported by each CPU architecture.

The machine-dependent optimization unit 145 performs optimization using CPU-dependent instructions (instructions specific to the target CPU architecture). The types of CPU-dependent instructions include various types of branch instructions as will be described below. The second embodiment concerns in particular optimization of the control structure in which the value of a variable is compared with a plurality of comparison values and the process branches in accordance with the comparison results. The machine-dependent optimization unit 145 includes an analysis unit 146 and a conversion unit 147.

The analysis unit 146 detects, for each of the plurality of comparison values, a comparison instruction that compares the value of a certain variable with the comparison value, and a branch instruction that causes a jump to a predetermined instruction when the two values match, from the intermediate code. The analysis unit 146 determines a control structure with the minimum number of comparison patterns, based on the range of the variable and the number of comparison values. The conversion unit 147 rewrites the intermediate code so as to reduce the average number of comparisons per value of the variable, based on the analysis result obtained by the analysis unit 146. In this step, the conversion unit 147 rearranges the order of the existing comparison instructions and branch instructions. Further, the conversion unit 147 creates an execution path that bypasses at least one or more of the existing comparison instructions and branch instructions, by inserting a new comparison instruction and a new branch instruction.

The instruction scheduling unit 148 performs scheduling to change the order of instructions included in the intermediate code. The scheduling includes, for example, parallelization that detects two or more independent instructions, and assigns the detected two or more instructions to different CPUs or different CPU cores. The scheduling also includes, for example, changing the order in which two or more independent instructions are executed so as to achieve efficient pipeline processing.

In the following, a description will be given of a target CPU.

Figure 5:
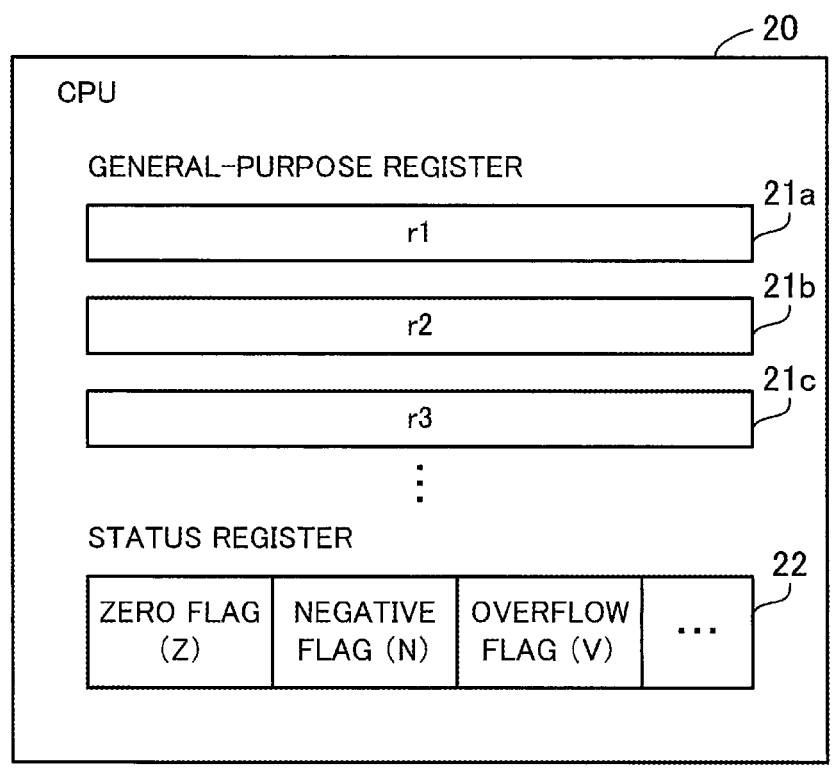
FIG. 5 illustrates exemplary configurations of registers in a processor.

FIG. 5 illustrates exemplary configurations of registers in a processor.

A CPU 20 is a processor capable of executing an executable file generated by the compiling apparatus 100. The CPU 20 may be included in the compiling apparatus 100, or may be included in another computer. The CPU 20 includes a plurality of general-purpose registers, including general-purpose registers 21a, 21b, and 21c (r1, r2, and r3), and a status register 22.

Each of the general-purpose registers 21a, 21b, and 21c is a volatile storage element (register) that temporarily stores data used for operations. The general-purpose registers 21a, 21b, and 21c may be explicitly specified in a user instruction included in the executable file. The status register 22 is a register that stores control flags indicating the execution status of an operation. The status register 22 is not explicitly specified in a user instruction included in the executable file, and is automatically updated by the CPU 20 as the operation progresses. The control flags include a zero flag (Z), a negative flag (N), and an overflow flag (V).

The zero flag indicates whether the operation result is 0. The zero flag may be represented by one bit, for example. The zero flag is updated each time a numeric operation is performed. The zero flag is set to ON (1) if the operation result is 0, and is set to OFF (0) if the operation result is not 0. In the CPU 20, a comparison operation that compares two values is implemented as a subtraction. Accordingly, the zero flag is set to ON if the two values match in the comparison operation, and is set to OFF if the two values do not match.

The negative flag indicates whether the operation result is a negative value. The negative flag may be represented by one bit, for example. The negative flag is updated each time a numeric operation is performed. The negative flag is set to ON (1) if the operation result is a negative value, and is set to OFF (0) if the operation result is greater than or equal to 0 (a non-negative value).

The overflow flag indicates whether the operation result has overflowed. Overflow is a situation in which the value of a variable does not fit in a specified number of digits (number of bits) and the operation result is greater than the maximum value or less than the minimum value of the type of the variable. For example, if the type of a certain variable is a 4-bit singed integer, the range of the variable is from −8 to 7. In this case, if the operation result is less than −8 or greater than 7, overflow occurs. When overflow occurs, the variable does not correctly represent the operation result. The overflow flag may be represented by one bit, for example. The overflow flag is updated each time a numeric operation is performed. The overflow flag is set to ON (1) if overflow occurs, and is set to OFF (0) if no overflow occurs.

FIG. 6 illustrates an example of processor information 151.

The processor information 151 indicates types of instructions supported by a certain CPU architecture. The compiler 131 may hold the processor information 151 so as to generate object code corresponding to the target CPU architecture. The processor information 151 indicates, as the types of instructions, cmp instruction, beq instruction, bne instruction, bl instruction, bg instruction, bge instruction, and ba instruction. In the second embodiment, the target CPU architecture supports these instructions. That is, the CPU 20 described above is able to execute these instructions.

A cmp instruction is a comparison instruction that compares the values of two operands (operands A and B) indicating numbers. As mentioned above, a cmp instruction is implemented as a subtraction A−B. If the values of the operands A and B match, the zero flag is set to ON (Z=1). If the value of the operand A is less than the value of the operand B, the negative flag is set to ON (N=1). If the result of the subtraction A−B is greater than the maximum value or less than the minimum value of the type of the variable, the overflow flag is set to ON (V=1).

A beq instruction is a conditional branch instruction that causes a jump to an instruction indicated by an operand "label" if the zero flag is ON, and does not cause a jump if the zero flag is OFF. In the case where a cmp instruction is executed immediately before the beq instruction, the beq instruction causes a jump if the values of the operands A and B match, and does not cause a jump if the values do not match.

A bne instruction is a conditional branch instruction that causes a jump to an instruction indicated by an operand "label" if the zero flag is OFF, and does not cause a jump if the zero flag is ON. In the case where a cmp instruction is executed immediately before the bne instruction, the bne instruction causes a jump if the values of the operands A and B do not match, and does not cause a jump if the values match.

A bl instruction is a conditional branch instruction that causes a jump to an instruction indicated by an operand "label" if the exclusive OR of the negative flag and the overflow flag (N xor V) is 1, and does not cause a jump if the exclusive OR is 0. In the case where a cmp instruction is executed immediately before the bl instruction, the bl instruction causes a jump if the value of the operand A is less than the value of the operand B (A<B), and does not cause a jump otherwise (A≥B).

A bg instruction is a conditional branch instruction that causes a jump to an instruction indicated by an operand "label" if a value calculated from the zero flag, the negative flag, and the overflow flag is 1, and does not cause a jump if the value is 0. This value is obtained by calculating the exclusive OR of the negative flag and the overflow flag, calculating the logical OR of the exclusive OR and the zero flag, and then negating the logical OR (not (Z or (N xor V))). In the case where a cmp instruction is executed immediately before the bg instruction, the bg instruction causes a jump if the value of the operand A is greater than the value of the operand B (A>B), and does not cause a jump otherwise (A≤B).

A bge instruction is a conditional branch instruction that causes a jump to an instruction indicated by an operand "label" if the negation of the exclusive OR of the negative flag and the overflow flag (not (N xor V)) is 1, and does not cause a jump if the negation of the exclusive OR is 0. In the case where a cmp instruction is executed immediately before the bge instruction, the bge instruction causes a jump if the value of the operand A is greater than or equal to the value of the operand B (A≥B), and does not cause a jump otherwise (A<B).

A ba instruction is an unconditional branch instruction that always causes a jump to an instruction indicated by an operand "label". Even in the case where a cmp instruction is executed immediately before the ba instruction, the ba instruction does not depend on the comparison result.

In the following, a description will be given of optimization performed by the machine-dependent optimization unit 145.

Figure 7:
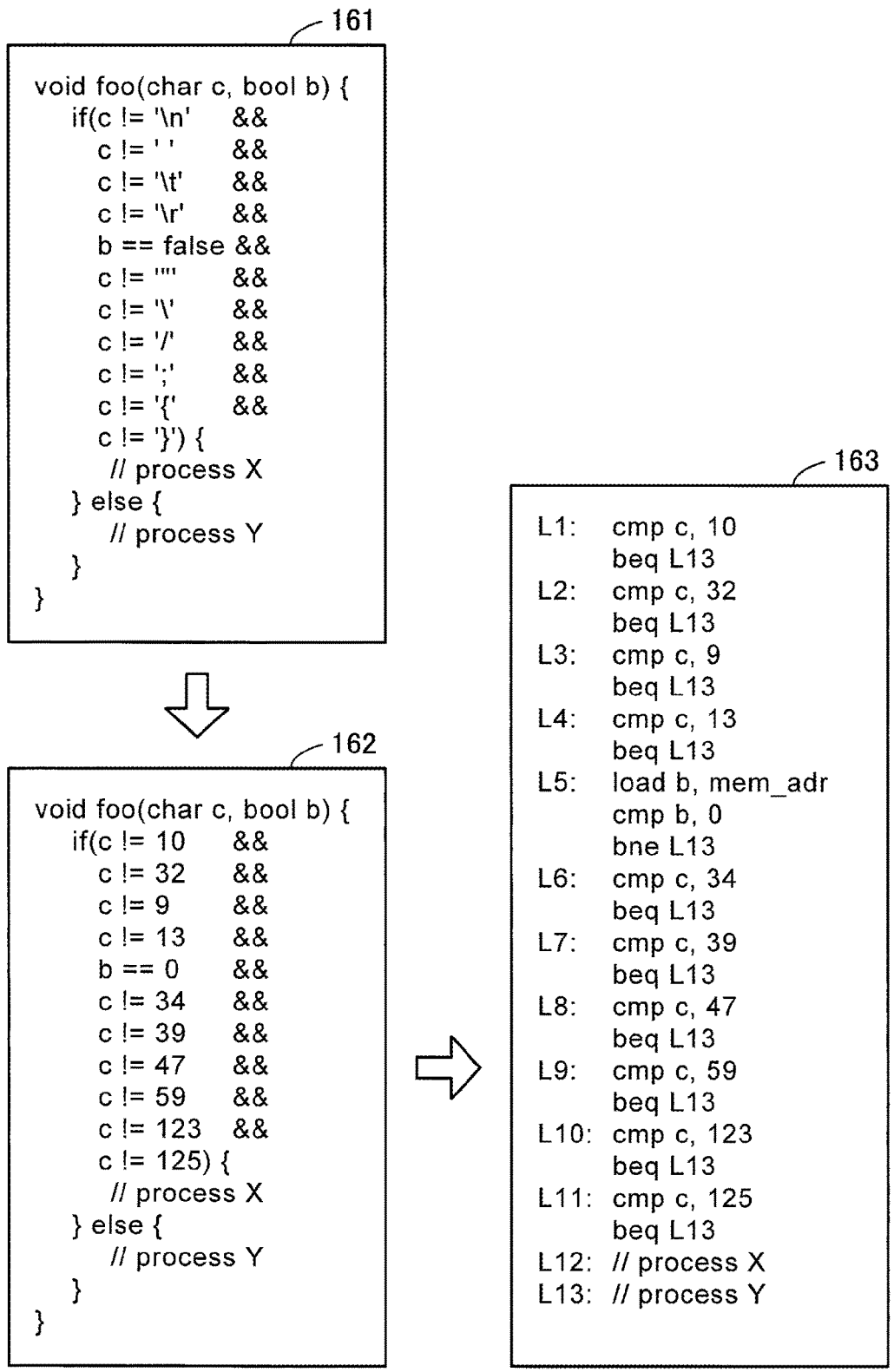
FIG. 7 illustrates an example of a program including successive branch instructions.

FIG. 7 illustrates an example of a program including successive branch instructions.

The intermediate code generation unit 133 converts code 161 into code 162, and converts the code 162 into code 163.

In FIG. 7, the code 161 and code 162 are written in a source code format, and the code 163 is written in a pseudo-assembler format. In reality, the code 163 is written in the intermediate language used in the compiling apparatus 100. The machine-dependent optimization unit 145 performs optimization on the intermediate code.

The code 161 defines a function foo that takes a character type variable c and a Boolean type variable b as arguments. The variable c represents a character. Note that since a character is represented by a character code of a predetermined number of bytes, the value of the variable c is internally an integer. The variable b represents true or false. Note that false is internally represented by 0, and true is internally represented by an integer other than 0. The function foo determines whether the character represented by the variable c does not match any of a plurality of predetermined characters and the value of the variable b is false. The predetermined plurality of characters include: line feed; space; tab; carriage return; double quotation ("); backslash (\); slash (/); semicolon (;); left curly brace ({); and right curly brace (}). The function foo executes a process X if the above condition is satisfied, and executes a process Y if the above condition is not satisfied.

The code 162 defines the same function foo as the code 161. In the code 162, however, each of the characters compared with the value of the variable c is replaced with an integer representing a character code. The integer "10" represents a line feed; "32" represents a space; "9" represents a tab; and "13" represents a carriage return. The integer "34" represents a double quotation; "39" represents a backslash; "47" represents a slash; "59" represents a semicolon; "123" represents a left curly brace; and "125" represents a right curly brace. These ten integers corresponding to character codes are comparison values that are compared with the value of the variable c. Further, in the code 162, the logical value compared with the value of the variable b is replaced with an integer. The integer "0" indicates false.

The code 163 represents the processing represented by the code 162 by using cmp instructions, beq instructions, a bne instruction, and a load instruction that are supported by the CPU 20. A load instruction is an instruction that loads data from the memory to a general-purpose register. The code 163 contains eleven cmp instructions, ten beq instructions, one bne instruction, and one load instruction.

In the code 163, at label L1, a cmp instruction that compares the value of the variable c with "10" is executed, and a beq instruction that causes a jump to label L13 is executed if the two values match. Then at label L2, a cmp instruction that compares the value of the variable c with "32" is executed, and a beq instruction that causes a jump to label L13 is executed if the two values match. Then at label L3, a cmp instruction that compares the value of the variable c with "9" is executed, and a beq instruction that causes a jump to label L13 is executed if the two values match.

Then at label L4, a cmp instruction that compares the value of the variable c with "13" is executed, and a beq instruction that causes a jump to label L13 is executed if the two values match. Then at label L5, a load instruction that loads the value of the variable b from the memory is executed; a cmp instruction that compares the value of the variable b with "0" is executed; and a bne instruction that causes a jump to label L13 is executed if the two values do not match.

Then at label L6, a cmp instruction that compares the value of the variable c with "34" is executed, and a beq instruction that causes a jump to label L13 is executed if the two values match. Then at label L7, a cmp instruction that compares the value of the variable c with "39" is executed, and a beq instruction that causes a jump to label L13 is executed if the two values match. Then at label L8, a cmp instruction that compares the value of the variable c with "47" is executed, and a beq instruction that causes a jump to label L13 is executed if the two values match.

Then at label L9, a cmp instruction that compares the value of the variable c with "59" is executed, and a beq instruction that causes a jump to label L13 is executed if the two values match. Then at label L10, a cmp instruction that compares the value of the variable c with "123" is executed, and a beq instruction that causes a jump to label L13 is executed if the two values match. Then at label L11, a cmp instruction that compares the value of the variable c with "125" is executed, and a beq instruction that causes a jump to label L13 is executed if the two values match.

If a jump is not caused by any of the branch instructions (the beq instructions and the bne instruction), the process X is executed at label L12. If a jump is caused by one of these branch instructions, the process Y is executed at label L13. That is, in the code 163, if the value of the variable c matches any of "10", "32", "9", "13", "34", "39", "47", "59", "123", and "125", or if the value of the variable b is not "0", the process Y is executed. Otherwise, the process X is performed. The processing indicated by the code 163 is equivalent to the processing indicated by the code 162.

Figure 8:
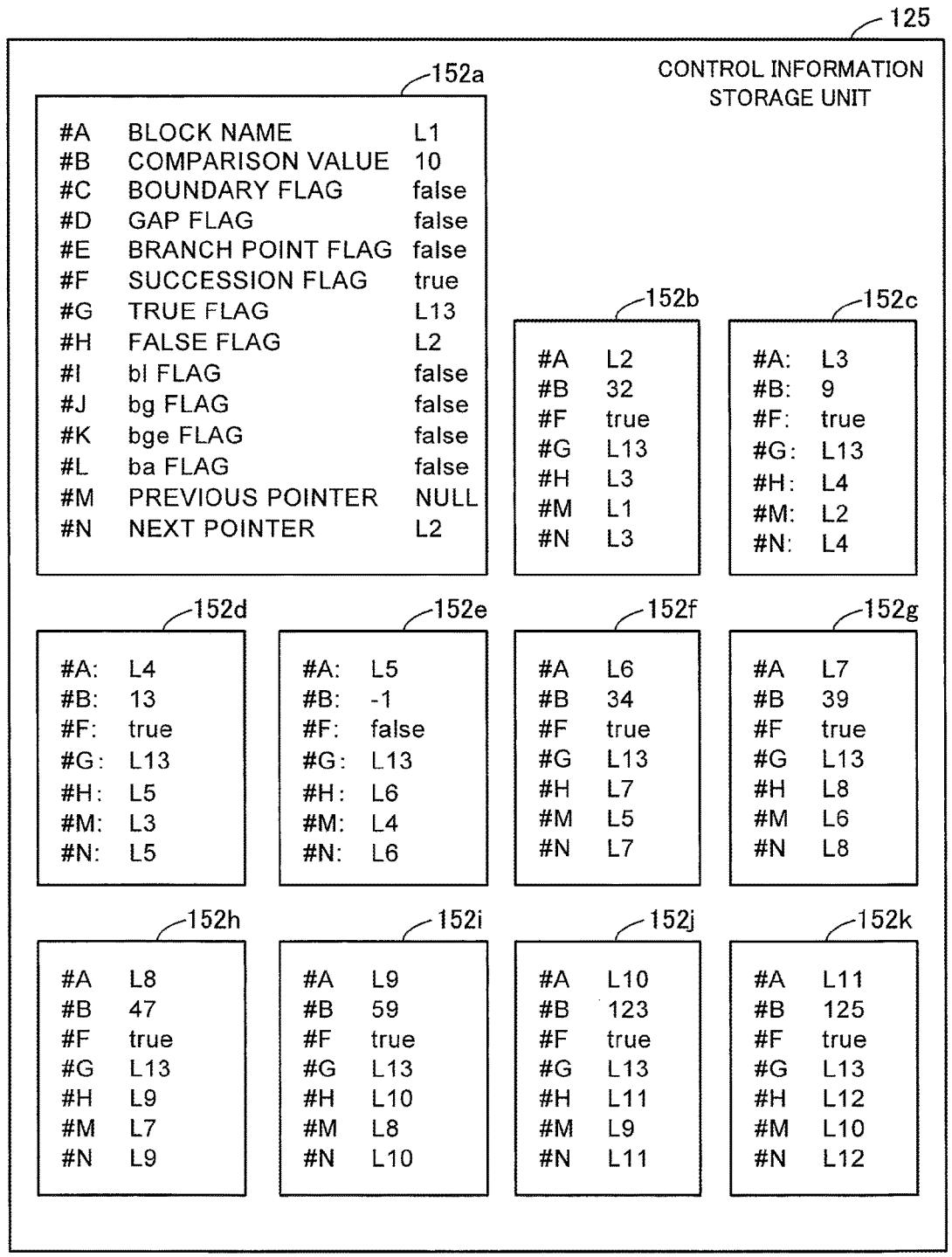
FIG. 8 illustrates examples of block records.

FIG. 8 illustrates examples of block records.

When the machine-dependent optimization unit 145 performs optimization, block records illustrated in FIG. 8 are generated from the above code 163 and stored in the control information storage unit 125. A block record is generated for each block of the intermediate code. Each block indicates a set of instructions that are successively executed. A branch instruction serves as a delimiter between blocks. In the second embodiment, each label of the code 163 corresponds to one block.

A block record 152a corresponds to label L1; a block record 152b corresponds to label L2; and a block record 152c corresponds to label L3. A block record 152d corresponds to label L4; a block record 152e corresponds to label L5; a block record 152f corresponds to label L6; and a block record 152g corresponds to label L7. A block record 152h corresponds to label L8; a block record 152i corresponds to label L9; a block record 152j corresponds to label L10; and a block record 152k corresponds to label L11.

Each block record includes the block name (item #A), a comparison value (item #B), a boundary flag (item #C), a gap flag (item #D), a branch point flag (item #E), a succession flag (item #F), a true block (item #G), and a false block (item #H). Each block record also includes a bl flag (item #I), a bg flag (item #J), a bge flag (item #K), a ba flag (item #L), a previous pointer (item #M), and a next pointer (item #N).

The block name is identification information that identifies a block. For example, a label is used as the block name. The comparison value is a fixed value to be compared with the value of a variable, and is a value of a second operand of a cmp instruction included in the block. However, if the succession flag (described below) of the block is false, the comparison value is set to −1. The boundary flag indicates whether the block is for boundary determination (described below). The gap flag indicates whether the block is for gap determination (described below). The branch point flag indicates whether the block is for branch point determination (described below). Blocks for boundary determination, gap determination, and branch point determination are inserted in the intermediate code through optimization. The initial values of the boundary flag, the gap flag, and the branch point flag are false.

The succession flag indicates whether the cmp instruction included in the block specifies, as its first operand, the same variable as that in another block. That is, the succession flag indicates whether a comparison operation is one of successive comparison operations performed on the same variable. In the case of the code 163 described above, since the blocks of labels L1 through L4 and L6 through L11 specify the same variable c as the object of comparison, their succession flags are true. On the other hand, since the block of label L5 specifies the variable b as the object of comparison, the succession flag is false. A true block is a block containing an instruction to which a jump is made from a branch instruction. A false block is a block containing the next instruction to be executed if a jump is not caused by a branch instruction, that is, a block containing an instruction following a branch instruction.

The bl flag indicates whether a bl instruction is used as a branch instruction at the end of the block. A bl instruction may be used in a block for boundary determination and a block for gap determination (described below). The bg flag indicates whether a bg instruction is used as a branch instruction at the end of the block. A bg instruction may be used in a block for boundary determination (described below). The bge flag indicates whether a bge instruction is used as a branch instruction at the end of the block. A bge instruction may be used in a block for branch point determination (described below). The initial values of the bl flag, the bg flag, and the bge flag are false. The ba flag indicates whether a ba instruction is inserted at the end of the block. The initial value of the ba flag is false.

The previous pointer points to a block located immediately before the current block. The previous pointer of the block at the top is NULL. The next pointer points to a block located immediately after the current block. The control information storage unit 125 stores a dummy block record indicating the end of the array of block records. A next pointer of the last block record is NULL.

For example, in the originally generated content of the block record 152a, the block name is L1; the comparison value is 10; the boundary flag is false; the gap flag is false; the branch point flag is false; the succession flag is true; the true block is L13; and the false block is L2. Further, the bl flag is false; the bg flag is false; the bge flag is false; the ba flag is false; the previous pointer is NULL; and the next pointer is L2. The content of each block record is sequentially updated in the course of examining the optimization method. In the following, the description of each of the boundary flag, the gap flag, the branch point flag, the bl flag, the bg flag, the bge flag, and the ba flag may be omitted if the value thereof is false (initial value).

FIG. 9 illustrates examples of a comparison value vector 153, an interval map 154, and an instruction table 155.

In the course of optimization performed by the machine-dependent optimization unit 145, the comparison value vector 153, the interval map 154, and the instruction table 155 are generated and stored in the control information storage unit 125.

The comparison value vector 153 associates the comparison values with indices. The indices are consecutive non-negative integers starting with 0. The comparison values are fixed integer values that are compared with the value of the same variable (for example, the value of the variable c in the code 163). A fixed integer value that is compared with the value of a different variable (for example, the value of the variable b in the code 163) is excluded from the comparison values. In the comparison value vector 153, the plurality of comparison values are sorted in ascending order. The size of the comparison value vector 153 indicates the number of comparison values. For example, the comparison value vector 153 with a size of 10 including the comparison values "9", "10", "13", "32", "34", "39", "47", "59", "123", and "125" is generated from the code 163 described above.

The interval map 154 associates the comparison values with intervals. The interval indicates the number of integers that are present between a certain comparison value and the closest comparison value greater than the certain comparison value and are not compared to the certain comparison value. The interval is associated with the smaller one of two adjacent comparison values. Note that in the interval map 154, the interval "0" is not registered. In the interval map 154, a plurality of intervals are sorted in descending order.

For example, there are 63 integers between the comparison value "59" and the comparison value "123", and therefore an interval "63" and the comparison value "59" are registered. Further, there are 18 integers between the comparison value "13" and the comparison value "32", and therefore an interval "18" and the comparison value "13" are registered. Similarly, an interval "11" and the comparison value "47", an interval "7" and the comparison value "39", an interval "4" and the comparison value an interval "2" and the comparison value "10", an interval "1", and the comparison value "32", and an interval "1" and the comparison value "123" are registered in the interval map 154.

The instruction table 155 associates each comparison value with an instruction type. The instruction type indicates the type of a branch instruction used in a block containing a certain comparison value. In the example of FIG. 9, the comparison value "39" and the bge instruction, the comparison value "34" and the ba instruction, the comparison value "13" and the bge instruction, the comparison value "10" and the ba instruction, the comparison value "59" and the bge instruction, and the comparison value "47" and the ba instruction are respectively associated with each other. The content of the instruction table 155 is reflected to the bge flag and the ba flag in each block record described above. The method of associating a comparison value with an instruction type will be described below.

Figure 10:
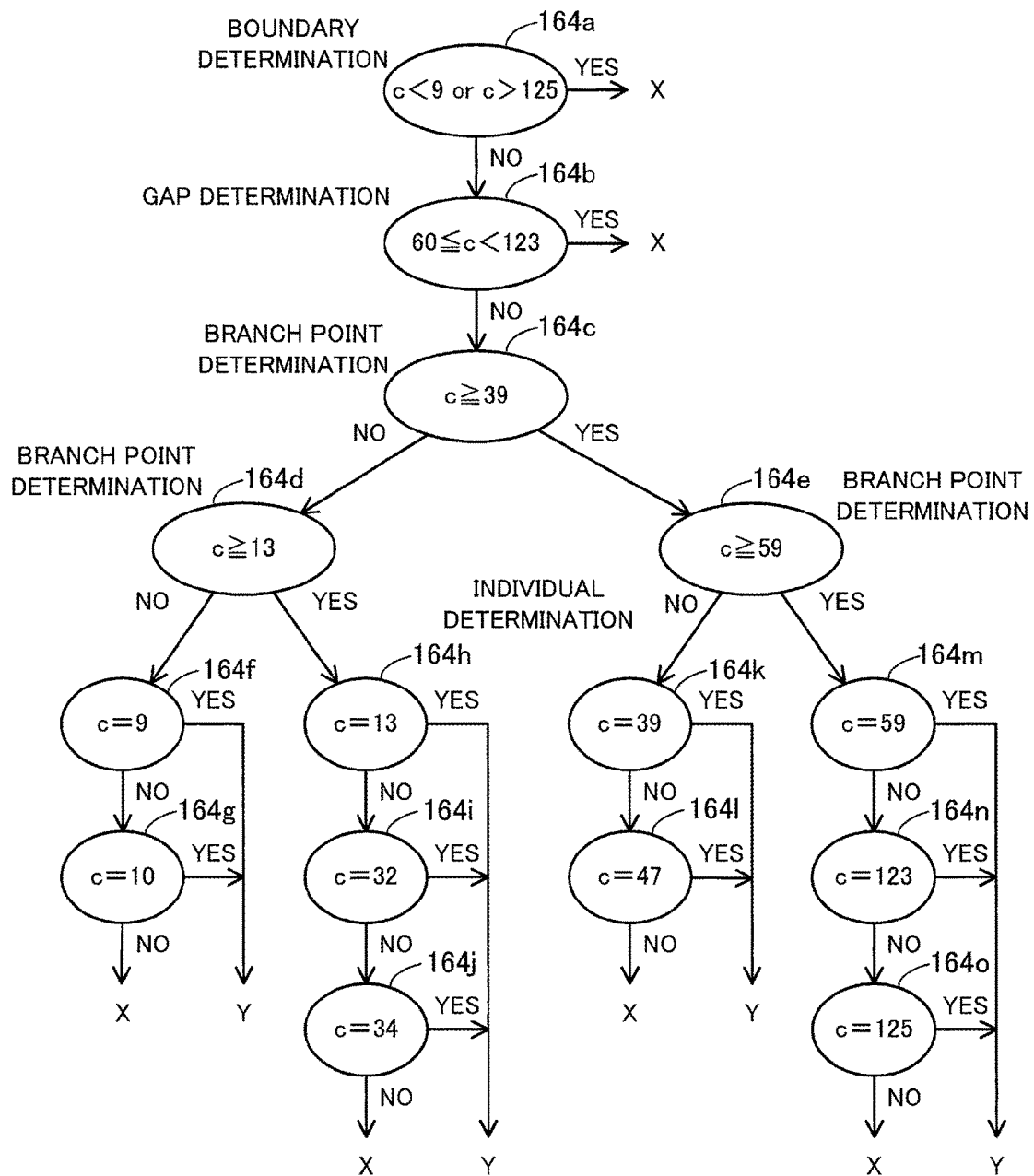
FIG. 10 illustrates an example of optimization of value determination.

FIG. 10 illustrates an example of optimization of value determination.

The machine-dependent optimization unit 145 converts the control structure indicated by the code 163 described above into a control structure illustrated in FIG. 10 so as to reduce the average number of comparisons per value of the variable c. A series of determination operations performed on a value of the variable c includes a boundary determination 164a; a gap determination 164b; branch point determinations 164c, 164d, and 164e; and individual determinations 164f, 164g, 164h, 164i, 164j, 164k, 164l, 164m, 164n, and 164o.

The individual determinations 164f, 164g, 164h, 164i, 164j, 164k, 164l, 164m, 164n, and 164o correspond to labels L1 through L4 and L6 through L11 of the code 163 described above. That is, the individual determination 164f determines whether the value of the variable c is "9". The individual determination 164g determines whether the value of the variable c is "10". The individual determination 164h determines whether the value of the variable c is "13". The individual determination 164i determines whether the value of the variable c is "32". The individual determination 164j determines whether the value of the variable c is "34". The individual determination 164k determines whether the value of the variable c is "39". The individual determination 164*l* determines whether the value of the variable c is "47". The individual determination 164*m* determines whether the value of the variable c is "59". The individual determination 164*n* determines whether the value of the variable c is "123". The individual determination 164*o* determines whether the value of the variable c is "125".

In this series of determination operations, the boundary determination 164*a*, the gap determination 164*b*, and the branch point determinations 164*c*, 164*d*, and 164*e* are inserted before the individual determinations 164*f*, 164*g*, 164*h*, 164*i*, 164*j*, 164*k*, 164*l*, 164*m*, 164*n*, and 164*o*.

The boundary determination 164*a* determines whether the value of the variable c is less than the minimum comparison value "9" or greater than the maximum comparison value "125". If the determination result of the boundary determination 164*a* is true, the value of the variable c does not match any of the comparison values. In this case, a jump may be made to the process X by skipping the gap determination 164*b*, the branch point determinations 164*c*, 164*d*, and 164*e*, and the individual determinations 164*f*, 164*g*, 164*h*, 164*i*, 164*j*, 164*k*, 164*l*, 164*m*, 164*n*, and 164*o*.

If the determination result of the boundary determination 164*a* is false, the gap determination 164*b* is performed. The gap determination 164*b* determines whether the value of the variable c is greater than or equal to the comparison value "60" and less than the comparison value "123". If the determination result of the gap determination 164*b* is true, since there is no comparison value between "59" and "123", it is obvious that the value of the variable c does not match any of the comparison values. In this case, a jump may be made to the process X by skipping the branch point determinations 164*c*, 164*d*, and 164*e*, and the individual determinations 164*f*, 164*g*, 164*h*, 164*i*, 164*j*, 164*k*, 164*l*, 164*m*, 164*n*, and 164*o*. Note that although a gap determination is performed only for the largest interval in FIG. 10, the gap determination may be performed for two or more intervals. The criterion for determining whether to perform a gap determination will be described below.

If the determination result of the gap determination 164*b* is false, the branch point determination 164*c* is performed. The branch point determination 164*c* determines whether the value of the variable c is greater than or equal to the comparison value "39". If the determination result of the branch point determination 164*c* is false, then the branch point determination 164*d* is performed. If the determination result of the branch point determination 164*c* is true, then the branch point determination 164*e* is performed.

The branch point determination 164*d* determines whether the value of the variable c is greater than or equal to the comparison value "13". If the determination result of the branch point determination 164*d* is false, a jump is made to the individual determination 164*f*. If the determination result of the branch point determination 164*d* is true, a jump is made to the individual determination 164*h*. The branch point determination 164*e* determines whether the value of the variable c is greater than or equal to the comparison value "59". If the determination result of the branch point determination 164*e* is false, a jump is made to the individual determination 164*k*. If the determination result of the branch point determination 164*e* is true, a jump is made to the individual determination 164*m*. The determination method for the branch point determinations 164*c*, 164*d*, and 164*e* corresponds to a binary search algorithm.

If the determination result of the individual determination 164*f* is true, a jump is made to the process Y. If the determination result of the individual determination 164*f* is false, the processing proceeds to the individual determination 164*g*. If the determination result of the individual determination 164*g* is true, a jump is made to the process Y. If the determination result of the individual determination 164*g* is false, since the value of the variable c has been determined to be less than "13" and therefore not to match any comparison value other than "9" and "10", a jump may be made to the process X.

If the determination result of the individual determination 164*h* is true, a jump is made to the process Y. If the determination result of the individual determination 164*h* is false, the processing proceeds to the individual determination 164*i*. If the determination result of the individual determination 164*i* is true, a jump is made to the process Y. If the determination result of the individual determination 164*i* is false, the processing proceeds to the individual determination 164*j*. If the determination result of the individual determination 164*j* is true, a jump is made to the process Y. If the determination result of the individual determination 164*j* is false, since the value of the variable c has been determined to be greater than or equal to "13" and be less than "39" and therefore not to match any comparison value other than "13", "32", and "34", a jump may be made to the process X.

If the determination result of the individual determination 164*k* is true, a jump is made to the process Y. If the determination result of the individual determination 164*k* is false, the processing proceeds to the individual determination 164*l*. If the determination result of the individual determination 164*l* is true, a jump is made to the process Y. If the determination result of the individual determination 164*l* is false, since the value of the variable c has been determined to be greater than or equal to "39" and be less than "59" and therefore not to match any comparison value other than "39" and a jump may be made to the process X.

If the determination result of the individual determination 164*m* is true, a jump is made to the process Y. If the determination result of the individual determination 164*m* is false, the processing proceeds to the individual determination 164*n*. If the determination result of the individual determination 164*n* is true, a jump is made to the process Y. If the determination result of the individual determination 164*n* is false, the processing proceeds to the individual determination 164*o*. If the determination result of the individual determination 164*o* is true, a jump is made to the process Y. If the determination result of the individual determination 164*o* is false, since the value of the variable c has been determined to be greater than or equal to "59" and therefore not to match any comparison value other than "59", "123", and "125", a jump may be made to the process X.

Note that the determination method for the branch point determination 164*c* and the subsequent determinations is different from a simple binary search algorithm, because individual determinations that are sequentially performed are included. In this regard, the determination method for the branch point determination 164*c* and the subsequent determinations may be considered as a quasi-binary search algorithm.

FIG. 11 illustrates an example of an optimized program.

The machine-dependent optimization unit 145 updates the block records described above such that the block records represent the control structure illustrated in FIG. 10. The machine-dependent optimization unit 145 rewrites the intermediate code based on the updated block records. Code 165 is obtained by optimizing the code 163. In FIG. 11, the code 165 is written in a pseudo-assembler format.

In the code 165, the block with label L5 in which a variable to be compared is different from variables in other blocks is moved to the top. Blocks with labels L14 and L15 are inserted after the block with label L5. The blocks with labels L14 and L15 correspond to the boundary determination 164a. At label L14, a determination is made as to whether the value of the variable c is less than "9". If the determination result is true, a jump is made to label L12. At label L15, a determination is made as to whether the value of the variable c is greater than 125. If the determination result is true, a jump is made to label L12.

Blocks with labels L16 and L17 are inserted after the block with label L15. The blocks with labels L16 and L17 correspond to the gap determination 164b. At label L16, a determination is made as to whether the value of the variable c is less than "60". If the determination result is true, a jump is made to label L18. At label L17, a determination is made as to whether the value of the variable c is less than "123". If the determination result is true, a jump is made to label L12.

A block with label L18 is inserted after the block with label L17. The block with label L18 corresponds to the branch point determination 164c. At label L18, a determination is made as to whether the value of the variable c is greater than or equal to "39". If the determination result is true, a jump is made to label L20. A block with label L19 is inserted after the block with label L18. The block with label L19 corresponds to the branch point determination 164d. At label L19, a determination is made as to whether the value of the variable c is greater than or equal to "13". If the determination result is true, a jump is made to label L4.

The blocks with labels L1 through L11 are sorted in ascending order of comparison value. The block with label L19 is followed by the block with label L3. The block with label L3 corresponds to the individual determination 164f. The block with label L3 is followed by the block with label L1. The block with label L1 corresponds to the individual determination 164g. A ba instruction that causes a jump to label L12 is inserted at the end of the block with label L1.

The block with label L1 is followed by the block with label L4. The block with label L4 corresponds to the individual determination 164h. The block with label L4 is followed by the block with label L2. The block with label L2 corresponds to the individual determination 164i. The block with label L2 is followed by the block with label L6. The block with label L6 corresponds to the individual determination 164j. A ba instruction that causes a jump to label L12 is inserted at the end of the block with label L6.

A block with label L20 is inserted after the block with label L6. The block with label L20 corresponds to the branch point determination 164e. At label L20, a determination is made as to whether the value of the variable c is greater than or equal to "59". If the determination result is true, a jump is made to label L9. The block with label L20 is followed by the block with label L7. The block with label L7 corresponds to the individual determination 164k. The block with label L7 is followed by the block with label L8. The block with label L8 corresponds to the individual determination 164l. A ba instruction that causes a jump to label L12 is inserted at the end of the block with label L8.

The block with label L8 is followed by the block with label L9. The block with label L9 corresponds to the individual determination 164m. The block with label L9 is followed by the block with label L10. The block with label L10 corresponds to the individual determination 164n. The block with label L10 is followed by the block with label L11. The block with label L11 corresponds to the individual determination 164o. Then, the block with label L11 is followed by the blocks with labels L12 and L13. Thus, the optimized code 165 has the control structure illustrated in FIG. 10.

In the following, a description will be given of a compilation procedure performed by the compiler 131.

Figure 12:
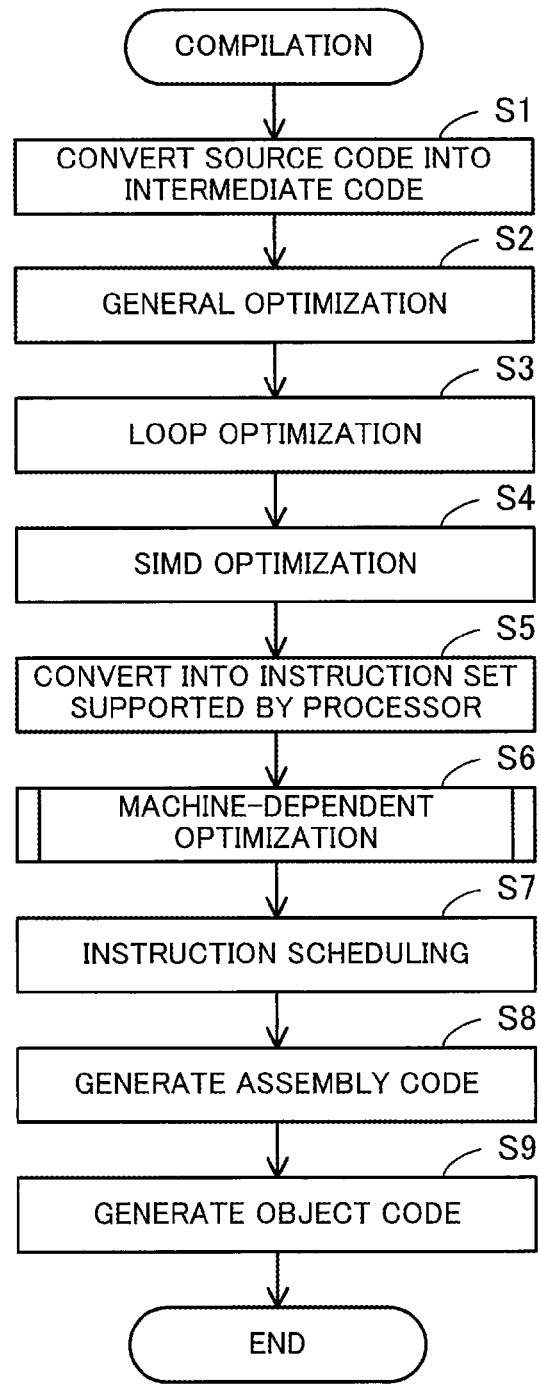
FIG. 12 is a flowchart illustrating an example of the procedure of compilation.

FIG. 12 is a flowchart illustrating an example of the procedure of compilation.

(S1) The source code input unit 132 reads source code from the source code storage unit 121. The intermediate code generation unit 133 analyzes the read source code, converts the source code into intermediate code, and stores the intermediate code in the intermediate code storage unit 122. The analysis of source code includes front-end processing such as lexical analysis, syntactic analysis, semantic analysis, and the like.

(S2) The general optimization unit 141 of the optimization unit 134 performs general optimization on the intermediate code stored in the intermediate code storage unit 122. The general optimization includes: removing variables that are not used; converting computation expressions dependent only on statically-determined values into constant expressions; reusing the calculation result of a subexpression shared by a plurality of computation expressions; and the like.

(S3) The loop optimization unit 142 of the optimization unit 134 detects a loop in the intermediate code stored in the intermediate code storage unit 122, and performs optimization on the loop. The loop optimization includes moving an operation out of a loop if the operation produces the same value in every loop iteration; expanding (unrolling) instructions in a loop so as to reduce the number times the loop iterates; and the like.

(S4) The SIMD optimization unit 143 of the optimization unit 134 performs optimization using SIMD instructions on the intermediate code stored in the intermediate code storage unit 122. That is, the SIMD optimization unit 143 detects a set of independent scalar instructions indicating the same type of operations from the intermediate code, and converts the detected set of scalar instructions into a SIMD instruction.

(S5) The instruction conversion unit 144 of the optimization unit 134 converts the instruction format used in the intermediate code stored in the intermediate code storage unit 122 into an instruction format of an instruction set supported by the target CPU architecture. In the case where the target CPU architecture is specified by the user using an option of a compile command, the instruction conversion unit 144 converts the instructions in the intermediate code into the instruction format of the specified CPU architecture.

(S6) The machine-dependent optimization unit 145 of the optimization unit 134 performs optimization using CPU-dependent instructions. The machine-dependent optimization unit 145 optimizes in particular the control structure in which the value of a variable is compared with a plurality of comparison values and the process branches in accordance with the comparison results. The following description will focus on machine-dependent optimization that optimizes such a control configuration.

(S7) The instruction scheduling unit 148 of the optimization unit 134 schedules the instructions in the intermediate code stored in the intermediate code storage unit 122. The scheduling includes: parallelizing instructions; changing the order of instructions in view of pipeline processing; and the like.

(S8) The assembly code generation unit 135 reads the optimized intermediate code from the intermediate code storage unit 122, and generates assembly code from the intermediate code.

(S9) The object code output unit 136 converts the assembly code generated in step S8 into object code, and stores the object code in the object code storage unit 123. In a later step, the linker 137 converts the generated object code into an executable file by linking the generated object code with other object code and libraries.

Figure 13:
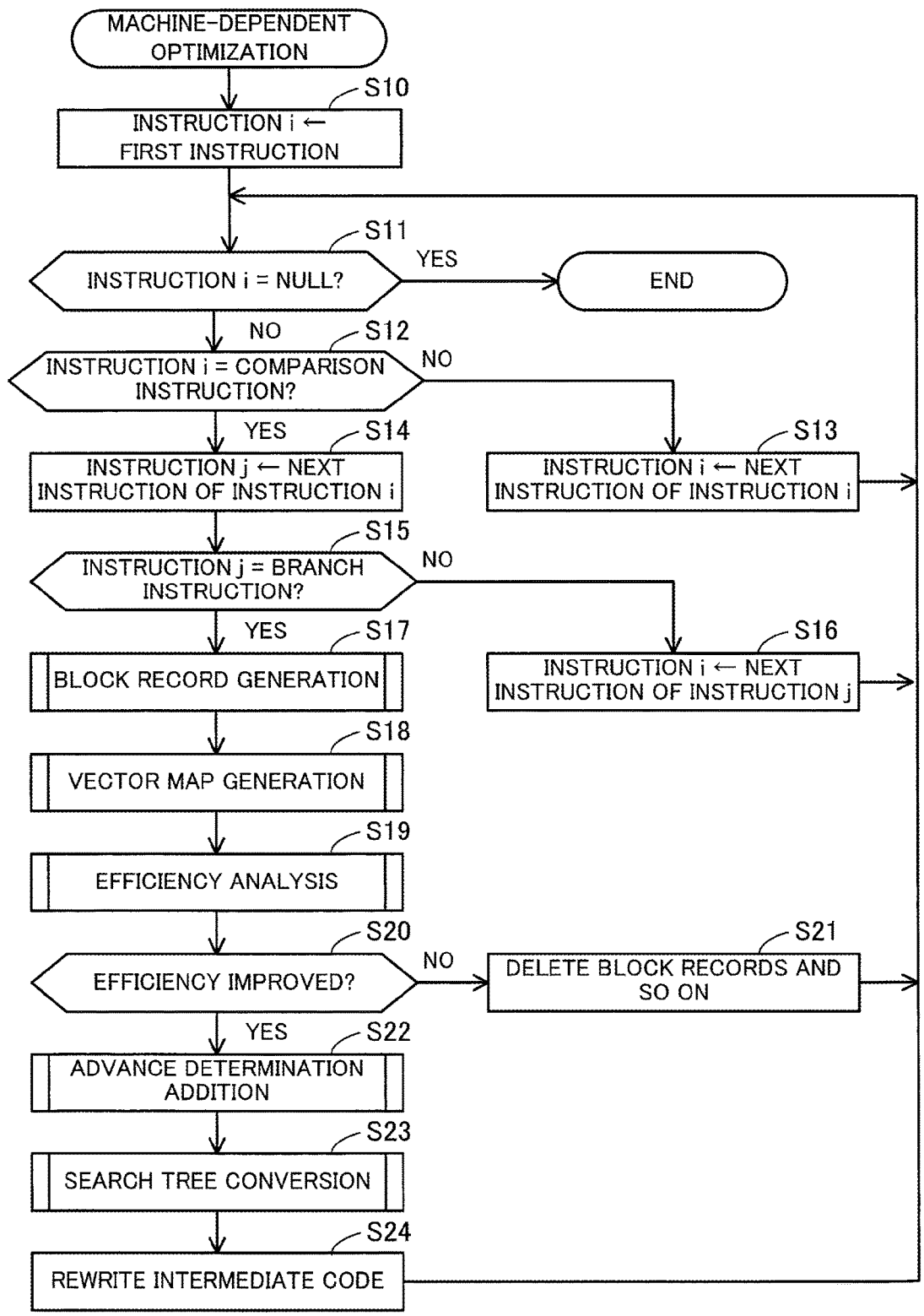
FIG. 13 is a flowchart illustrating an example of the procedure of machine-dependent optimization.

FIG. 13 is a flowchart illustrating an example of the procedure of machine-dependent optimization.

The machine-dependent optimization is performed in step S6 described above.

(S10) The analysis unit 146 selects the first instruction in the intermediate code as an instruction i.

(S11) The analysis unit 146 determines whether there is an instruction to be selected as an instruction i (whether the instruction i is NULL). If the instruction i is NULL, the machine-dependent optimization ends. If the instruction i is not NULL, the processing proceeds to step S12.

(S12) The analysis unit 146 determines whether the instruction i is a comparison instruction (a cmp instruction). If the instruction i is a comparison instruction, the processing proceeds to step S14. If the instruction i is not a comparison instruction, the processing proceeds to step S13.

(S13) The analysis unit 146 selects an instruction following the current instruction i as a new instruction i. Then, the processing returns to step S11.

(S14) The analysis unit 146 selects an instruction following the current instruction i as an instruction j.

(S15) The analysis unit 146 determines whether the instruction j is a branch instruction (a beq instruction, a bne instruction, or the like). If the instruction j is a branch instruction, the processing proceeds to step S17. If the instruction j is not a branch instruction, the processing proceeds to step S16.

(S16) The analysis unit 146 selects an instruction following the current instruction j as a new instruction i. Then, the processing returns to step S11.

(S17) The analysis unit 146 detects a series of comparison operations and a branch operation starting with the instruction i from the intermediate code, and generates block records for the detected series of comparison operations and branch operation. The details of block record generation will be described below.

(S18) The analysis unit 146 generates the comparison value vector 153 based on the block records generated in step S17, and generates the interval map 154 based on the comparison value vector 153. The details of vector map generation will be described below.

(S19) The analysis unit 146 estimates the number of comparison patterns in the case where the control structure is changed, while varying the number of gap determinations, based on the interval map 154 generated in step S18. The analysis unit 146 determines the number of gap determinations that minimizes the number of comparison patterns, and determines the resulting number of comparison patterns. The analysis unit 146 also estimates the number of comparison patterns in the case where the control structure is not changed. The analysis unit 146 compares the number of comparison patterns in the case where the control structure is not changed with that in the case where the control structure is changed, and determines whether the execution efficiency is improved by changing the control structure. The details of efficiency evaluation will be described below.

(S20) If the efficiency is determined to be improved in step S19, the processing proceeds to step S22. If the efficiency is determined not to be improved, the processing proceeds to step S21.

(S21) The analysis unit 146 deletes the block records generated in step S17 and the comparison value vector 153 and the interval map 154 generated in step S18, from the control information storage unit 125. Then, the processing returns to step S11.

(S22) The conversion unit 147 adds and updates block records such that the boundary determination 164*a* and the gap determination 164*b* are performed in advance of the individual determinations 164*f*, 164*g*, 164*h*, 164*i*, 164*j*, 164*k*, 164*l*, 164*m*, 164*n*, and 164*o*. The details of advance determination addition will be described below.

(S23) The conversion unit 147 adds and updates block records such that the branch point determinations 164*c*, 164*d*, and 164*e* are performed after the boundary determination 164*a* and the gap determination 164*b*. Further, the conversion unit 147 updates the block records such that the comparison operations in the individual determinations 164*f*, 164*g*, 164*h*, 164*i*, 164*j*, 164*k*, 164*l*, 164*m*, 164*n*, and 164*o* have a control structure based on a binary search tree. The details of search tree conversion will be described below.

(S24) The conversion unit 147 rewrites the intermediate code based on the block records updated in steps S22 and S23. Then, the processing returns to step S11.

Figure 14:
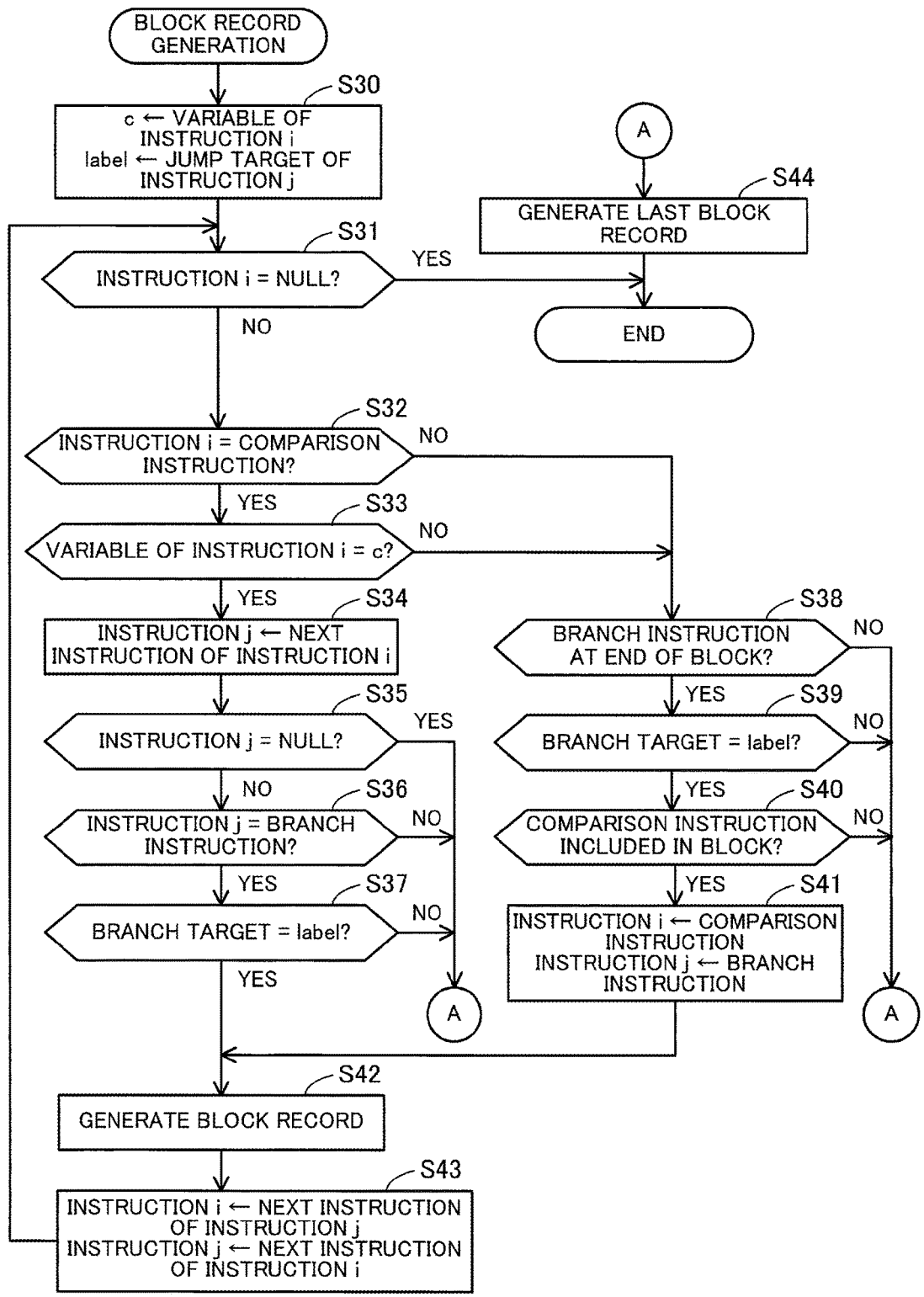
FIG. 14 is a flowchart illustrating an example of the procedure of block record generation.

FIG. 14 is a flowchart illustrating an example of the procedure of block record generation.

The block record generation is performed in step S17 described above.

(S30) The analysis unit 146 selects a first operand of the instruction i as a variable c. Further, the analysis unit 146 extracts an operand of the instruction j as a jump target label.

(S31) The analysis unit 146 determines whether there is an instruction to be selected as an instruction i (whether the instruction i is NULL). If the instruction i is NULL, the block record generation ends. If the instruction i is not NULL, the processing proceeds to step S32.

(S32) The analysis unit 146 determines whether the instruction i is a comparison instruction (a cmp instruction). If the instruction i is a comparison instruction, the processing proceeds to step S33. If the instruction i is not a comparison instruction, the processing proceeds to step S38.

(S33) The analysis unit 146 determines whether the first operand of the instruction i is identical to the variable c extracted in step S30. If the first operand of the instruction i is identical to the variable c, the processing proceeds to step S34. If not, the processing proceeds to step S38.

(S34) The analysis unit 146 selects an instruction following the current instruction i as an instruction j.

(S35) The analysis unit 146 determines whether there is an instruction to be selected as an instruction j (whether the instruction j is NULL). If the instruction j is NULL, the processing proceeds to step S44. If the instruction j is not NULL, the processing proceeds to step S36.

(S36) The analysis unit 146 determines whether the instruction j is a branch instruction (a beq instruction, a bne instruction, or the like). If the instruction j is a branch instruction, the processing proceeds to step S37. If the instruction j is not a branch instruction, the processing proceeds to step S44.

(S37) The analysis unit 146 determines whether the operand of the instruction j is identical to the jump target label extracted in step S30. If the operand of the instruction j is identical to the jump target label, the processing proceeds to step S42. If not, the processing proceeds to step S44.

(S38) The analysis unit 146 determines whether an instruction at the end of the block containing the instruction i is a branch instruction. If the instruction at the end is a branch instruction, the processing proceeds to step S39. If the instruction at the end is not a branch instruction, the processing proceeds to step S44.

(S39) The analysis unit 146 determines whether an operand of the branch instruction at the end of the block containing the instruction i is identical to the jump target label extracted in step S30. If the operand of the branch instruction at the end is identical to the jump target label, the processing proceeds to step S40. If not, the processing proceeds to step S44.

(S40) The analysis unit 146 determines whether there is a comparison instruction in the block containing the instruction i. If there is a comparison instruction, the processing proceeds to step S41. If there is no comparison instruction, the processing proceeds to step S44.

(S41) The analysis unit 146 selects the comparison instruction in the block containing the current instruction i as a new instruction i. The analysis unit 146 also selects the branch instruction at the end of the block containing the instruction i as a new instruction j.

(S42) The analysis unit 146 generates a block record corresponding to the block containing the instructions i and j, based on the instructions i and j. The block name (item #A) is the label of the current block. The comparison value (item #B) is a second operand of the instruction i. The boundary flag (item #C), the gap flag (item #D), and the branch point flag (item #E) are false. The succession flag (item #F) is true if the processing has not passed through step S41, and is false if the processing has passed through step S41. The true block (item #G) is an operand of the instruction j. The false block (item #H) is the label of the block following the current block.

The bl flag (item #I), the bg flag (item #J), the bge flag (item #K), and the ba flag (item #L) are false. The previous pointer (item #M) is the label of the block preceding the current block. If there is no preceding block, the previous pointer is NULL. The next pointer (item #N) is the label of the block following the current block.

(S43) The analysis unit 146 selects an instruction following the current instruction j as a new instruction i. The analysis unit 146 also selects an instruction following the new instruction i as a new instruction j. Then, the processing returns to step S31.

(S44) The analysis unit 146 generates the last block record. The block name (item #A) of the last block record is the label of the block containing the instruction i (a block following a block group that performs a series of comparison operations and a branch operation). The succession flag (item #F) is false. The previous pointer (item #M) is the label of the block preceding the current block. The next pointer (item #N) is NULL. The other items may be blank.

Figure 15:
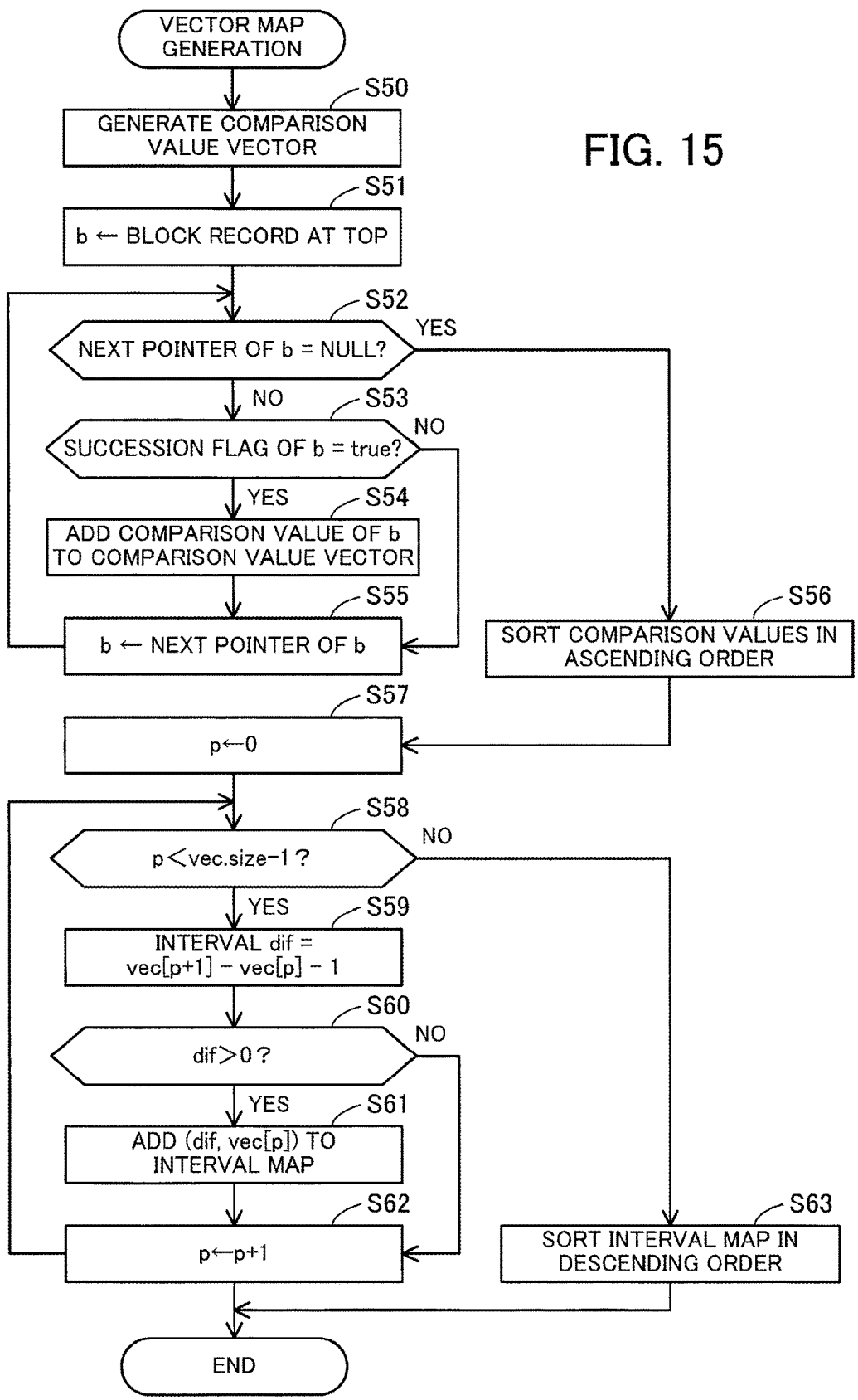
FIG. 15 is a flowchart illustrating an example of the procedure of vector map generation.

FIG. 15 is a flowchart illustrating an example of the procedure of vector map generation.

The vector map generation is performed in step S18 described above.

(S50) The analysis unit 146 generates the comparison value vector 153.

(S51) The analysis unit 146 selects a block record at the top as a block record b.

(S52) The analysis unit 146 determines whether the next pointer (item #N) of the block record b is NULL. If the next pointer is NULL, the processing proceeds to step S56. If the next pointer is not NULL, the processing proceeds to step S53.

(S53) The analysis unit 146 determines whether the succession flag (item #F) of the block record b is true. If the succession flag is true, the processing proceeds to step S54. If the succession flag is false, the processing proceeds to step S55.

(S54) The analysis unit 146 adds the comparison value (item #B) of the block record b to the comparison value vector 153.

(S55) The analysis unit 146 selects a block record pointed to by the next pointer (item #N) of the block record b as a next block record b. Then, the processing returns to step S52.

(S56) The analysis unit 146 sorts comparison values in the comparison value vector 153 in ascending order.

(S57) The analysis unit 146 assigns 0 to an index p.

(S58) The analysis unit 146 determines whether the index p is less than a value obtained by subtracting 1 from the size of the comparison value vector 153. If the above condition is satisfied, the processing proceeds to step S59. If not, the processing proceeds to step S63.

(S59) The analysis unit 146 acquires a comparison value indicated by the index p and a comparison value indicated by an index p+1 from the comparison value vector 153. The analysis unit 146 calculates, as an interval dif, a value by subtracting the comparison value of the index p and subtracting 1 from the comparison value of the index p+1.

(S60) The analysis unit 146 determines whether the interval dif is greater than 0. If the above condition is satisfied, the processing proceeds to step S61. If not, the processing proceeds to step S62.

(S61) The analysis unit 146 adds the interval dif and the comparison value of the index p in association with each other, to the interval map 154. The interval dif corresponds to a key of the interval map 154.

(S62) The analysis unit 146 adds 1 to the index p (increments the index p). Then, the processing returns to step S58.

(S63) The analysis unit 146 sorts the interval map 154 in descending order of interval.

Figure 16:
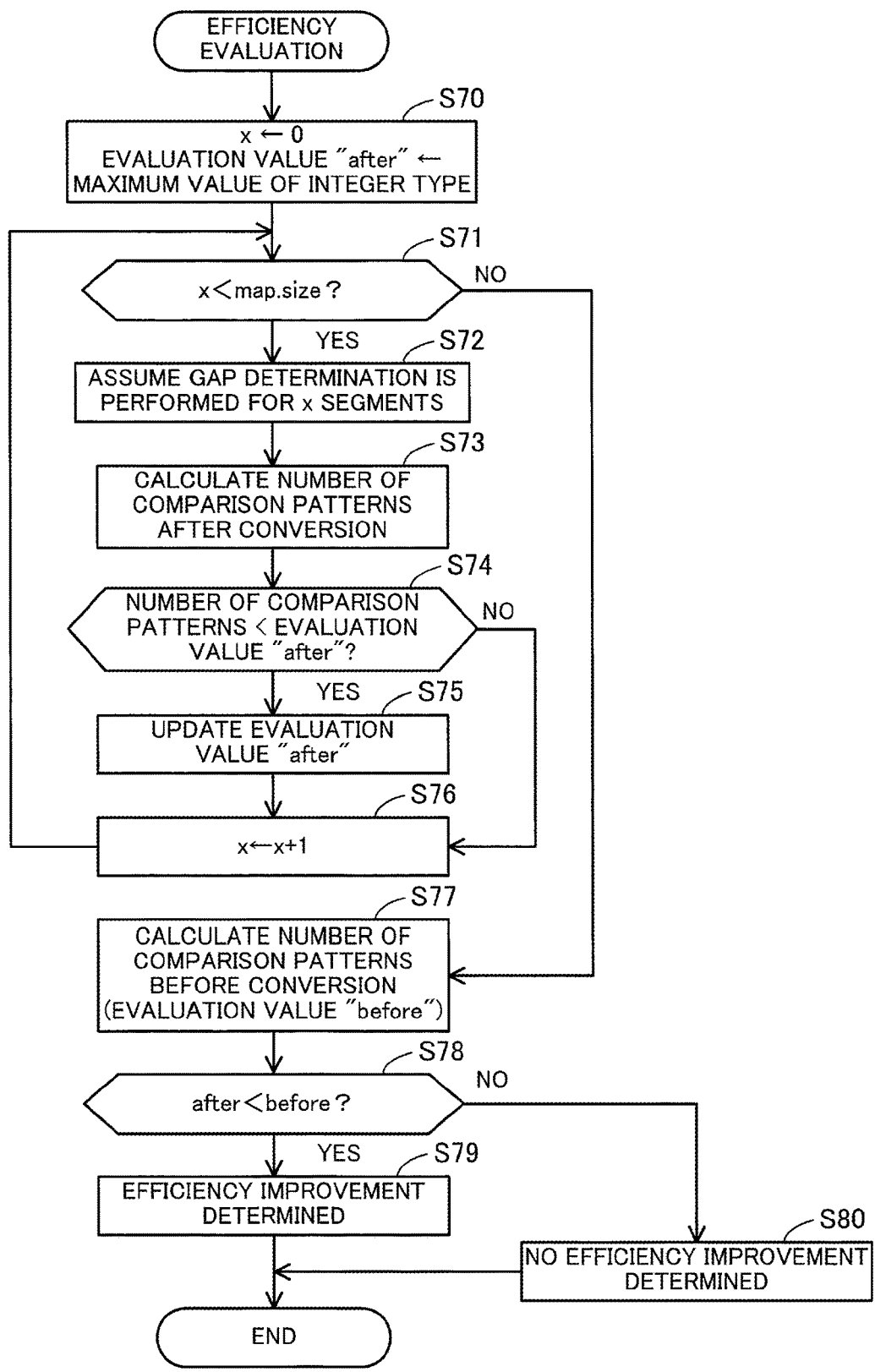
FIG. 16 is a flowchart illustrating an example of the procedure of efficiency evaluation.

FIG. 16 is a flowchart illustrating an example of the procedure of efficiency evaluation.

The efficiency evaluation is performed in step S19 described above.

(S70) The analysis unit 146 assigns 0 to the number of segments x. Further, the analysis unit 146 assigns the maximum value of the integer type to an evaluation value "after" which indicates the number of comparison patterns of the control structure after the conversion. For example, the analysis unit 146 assigns 4,294,967,295, which is the maximum value of an unsigned long integer, to the evaluation value "after".

(S71) The analysis unit 146 determines whether the number of segments x is less than the size of the interval map 154. If the number of segments x is less than the size of the interval map 154, the processing proceeds to step S72. Otherwise, the processing proceeds to step S77.

(S72) The analysis unit 146 assumes that a gap determination is performed for x segments out of the segments, each defined between two adjacent comparison values, indicated in the interval map 154. In this step, the analysis unit 146 preferentially selects x segments with greater intervals.

(S73) The analysis unit 146 calculates the number of comparison patterns of the control structure after the conversion in the case where a gap determination is performed for x segments.

In this calculation, k is the number of comparison values (the size of the comparison value vector 153). In the case of the example of FIG. 7, k=10. Further, d is the depth of a binary tree. The depth of a binary tree corresponds to the number of stages of branch point determination. In the example of FIG. 10, d=2. The value of d may be determined in advance, or may vary according to the number of comparison values. Further, $K_{max}$ is the maximum value of the type of the variable c, and $K_{min}$ is the minimum value of the type of the variable c. In the case of the example of FIG. 7, since the variable c is of the char type, $K_{max}$=127 and $K_{min}$=−128. Further, $k_{max}$ is the maximum comparison value, and $k_{min}$ is the minimum comparison value. In the case of the example of FIG. 7, $k_{max}$=125 and $k_{min}$=9.

Further, P=$K_{max}$−$K_{min}$+1; K=$k_{max}$−$k_{min}$+1; m=quotient of $k/2^d$; and n=remainder of $k/2^d$. In the case of the example of FIG. 7, P=256; K=117; m=2; and n=2. Further, w is an array of intervals that are registered in the interval map 154 and are sorted in descending order.

The analysis unit 146 is able to calculate the number of comparison patterns of the control structure after the conversion by assigning the values of the above parameters to expression (1). The number of comparison patterns calculated by expression (1) represents the number of comparisons that are made in the case where all the integers that may be taken by the variable c are input. Note that t, y, and z are temporary variables whose values change within the expression.

$$2P + 2\left(K \cdot x - \sum_{z=0}^{x-2}\sum_{y=0}^{z} w[y]\right) + \left(K - \sum_{y=0}^{x-1} w[y]\right)d + \sum_{t=0}^{m-1}\left(K - \sum_{y=0}^{x-1} w[y] - 2^d \cdot t\right) + \frac{n}{2^d}\left(K - \sum_{y=0}^{x-1} w[y] - 2^d \cdot m\right) \quad (1)$$

The first term of expression (1) represents the number of comparisons made in the boundary determination. The second term of expression (1) represents the number of comparisons made in the gap determination for integers for which the determination result of the boundary determination is false. The number of comparisons in the gap determination and the subsequent determination operations depends on the number of segments x. The third term of expression (1) represents the number of comparisons made in the branch point determinations for integers for which the determination result of the gap determination is false. The fourth term of expression (1) represents the number of comparisons made in the individual determinations within the depth common to all the paths. In the case of the example of FIG. 10, since the depth of individual determination common to all the paths is 2, the fourth term represents the number of comparisons made in the individual determinations 164f, 164g, 164h, 164i, 164k, 164l, 164m, and 164n. The fifth term of expression (1) represents the number of comparisons made in the other individual determinations. In the case of the example of FIG. 10, the fifth term represents the number of comparisons made in the individual determinations 164j and 164o which are not counted in the fourth term.

(S74) The analysis unit 146 determines whether the number of comparison patterns calculated in step S73 is less than the evaluation value "after". If the calculated number of comparison patterns is less than the evaluation value "after", the processing proceeds to step S75. If the calculated number of comparison patterns is greater than or equal to the evaluation value "after", the processing proceeds to step S76.

(S75) The analysis unit 146 assigns the number of comparison patterns calculated in step S73 to the evaluation value "after", and stores the number of segments x in association with the updated evaluation value "after".

(S76) The analysis unit 146 adds 1 to the number of segments x (increments the number of segments x). Then, the processing returns to step S71. With these steps S71 through S76, the number of segments x that minimizes the evaluation value "after" and the resulting evaluation value "after" are determined.

In the case of the example of FIG. 7, the number of comparison patterns corresponding to the number of segments x=0 is 512+234+230+54=1,030. The number of comparison patterns corresponding to the number of segments x=1 is 512+234+108+104+23=981. The number of comparison patterns corresponding to the number of segments x=2 is 512+342+72+68+14=1,008. The number of comparison patterns corresponding to the number of segments x=3 is 512+414+50+46+8=1,030. The number of comparison patterns corresponding to the number of segments x=4 is 512+464+36+32+5=1,049. The number of comparison patterns corresponding to the number of segments x=5 is 512+500+28+24+3=1,067. The number of comparison patterns corresponding to the number of segments x=6 is 512+528+24+20+2=1,086.

Accordingly, the evaluation value "after"=981 and the number of segments x=2 are determined. As described above, when the number of segments x is increased, the number of integers that reach the branch point determinations and individual determinations is reduced, which makes it possible to reduce the number of comparisons in the branch point determinations and individual determinations. On the other hand, when the number of segments x is increased, the number of comparisons in the gap determination is increased. Therefore, the number of segments x that minimizes the evaluation value "after" is often between 0 (no gap determination performed) and the maximum value (gap determinations performed for all the segments).

(S77) The analysis unit 146 calculates the number of comparison patterns of the control structure before the conversion, and assigns the calculated number of comparison patterns to the evaluation value "before". The number of comparison patterns of the control structure before the conversion may be calculated by assigning P and k described above to expression (2). The number of comparison patterns calculated by expression (2) represents the number of comparisons that are made in the case where all the integers that may be taken by the variable c are input. Note that y is a temporary variable whose value changes within the expression.

$$\sum_{y=0}^{k-1}(P-y) \quad (2)$$

(S78) The analysis unit 146 determines whether the evaluation value "after" is less than the evaluation value "before" (after <before). If the evaluation value "after" is less than the evaluation value "before", the processing proceeds to step S79. If the evaluation value "after" is greater than or equal to the evaluation value "before", the processing proceeds to step S80.

(S79) The analysis unit 146 determines that the execution efficiency is improved (there is an improvement in efficiency) by converting the control structure. Then, the efficiency evaluation ends.

(S80) The analysis unit 146 determines that the execution efficiency is not improved (there is no improvement in efficiency) even by converting the control structure. Note that even when the evaluation value "after" is less than the evaluation value "before", if the difference between the two evaluation values is less than a threshold, the analysis unit 146 may determine that there is no improvement in efficiency.

Figure 17:
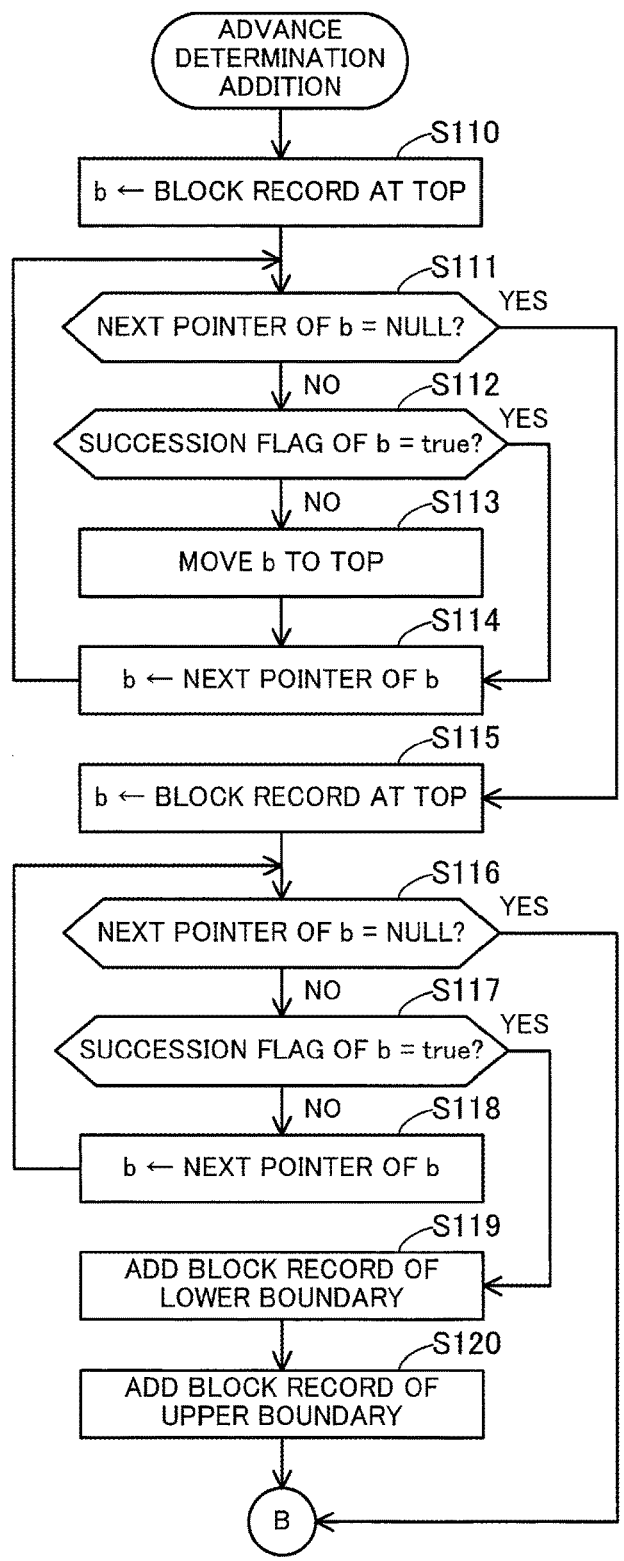
FIG. 17 is a flowchart illustrating an example of the procedure of advance determination addition.

FIG. 17 is a flowchart illustrating an example of the procedure of advance determination addition.

The advance determination addition is performed in step S22 described above.

(S110) The conversion unit 147 selects a block record at the top as a block record b.

(S111) The conversion unit 147 determines whether the next pointer (item #N) of the block record b is NULL. If the next pointer is NULL, the processing proceeds to step S115. If the next pointer is not NULL, the processing proceeds to step S112.

(S112) The conversion unit 147 determines whether the succession flag (item #F) of the block record b is true. If the succession flag is true, the processing proceeds to step S114. If the succession flag is false, the processing proceeds to step S113.

(S113) The conversion unit 147 moves the block record b to the top. That is, the conversion unit 147 updates the previous pointer (item #M) of the block record b to NULL, and updates the next pointer (item #N) of the block record b to the block name (item #A) of the block record originally located at the top. Further, the conversion unit 147 reflects the change in the order to the previous pointer (item #M) of the block record originally located at the top, the next pointer (item #N) of the block record preceding the block record b, and the previous pointer (item #M) of the block record following the block record b.

(S114) The conversion unit 147 selects a block record pointed to by the next pointer (item #N) of the block record b as a next block record b. However, if the block record b is moved in step S113, the conversion unit 147 selects a block record pointed to by the next pointer (item #N) before the movement. Then, the processing returns to step S111.

(S115) The conversion unit 147 selects a block record at the top as a block record b.

(S116) The conversion unit 147 determines whether the next pointer (item #N) of the block record b is NULL. If the next pointer is NULL, the processing proceeds to step S121. If the next pointer is not NULL, the processing proceeds to step S117.

(S117) The conversion unit 147 determines whether the succession flag (item #F) of the block record b is true. If the succession flag is true, the processing proceeds to step S119. If the succession flag is false, the processing proceeds to step S118.

(S118) The conversion unit 147 selects a block record pointed to by the next pointer (item #N) of the block record b as a next block record b. Then, the processing returns to step S116.

(S119) The conversion unit 147 adds a new block record before the block record b. The block record added in this step is a block record of a block that compares the value of the variable c and the minimum comparison value (lower boundary) in the boundary determination.

The block name (item #A) is a new label different from the existing labels. The comparison value (item #B) is the minimum comparison value ($k_{min}$). The boundary flag (item #C) is true. The gap flag (item #D), the branch point flag (item #E), and the succession flag (item #F) are false. The true block (item #G) is the block name of the last block record. The false block (item #H) is the block name of a block record to be added in step S120 (described below). The bl flag (item #I) is true. The bg flag (item #J), the bge flag (item #K), and the ba flag (item #L) are false. The previous pointer (item #M) is the block name of the immediately preceding block record. The next pointer (item #N) is the block name of the block record to be added in step S120. Further, the conversion unit 147 updates the next pointer (item #N) of the immediately preceding block record.

(S120) The conversion unit 147 adds a new block record after the block record added in step S119. The block record added in this step is a block record of a block that compares the value of the variable c and the maximum comparison value (upper boundary) in the boundary determination.

The block name (item #A) is a new label different from the existing labels. The comparison value (item #B) is the maximum comparison value ($k_{max}$). The boundary flag (item #C) is true. The gap flag (item #D), the branch point flag (item #E), and the succession flag (item #F) are false. The true block (item #G) is the block name of the last block record. The false block (item #H) is the block name of the block record b. The bg flag (item #J) is true. The bl flag (item #I), the bge flag (item #K), and the ba flag (item #L) are false. The previous pointer (item #M) is the block name of the block record added in step S119. The next pointer (item #N) is the block name of the block record b. The conversion unit 147 updates the previous pointer (item #M) of the block record b. Then, the processing proceeds to step S121.

Figure 18:
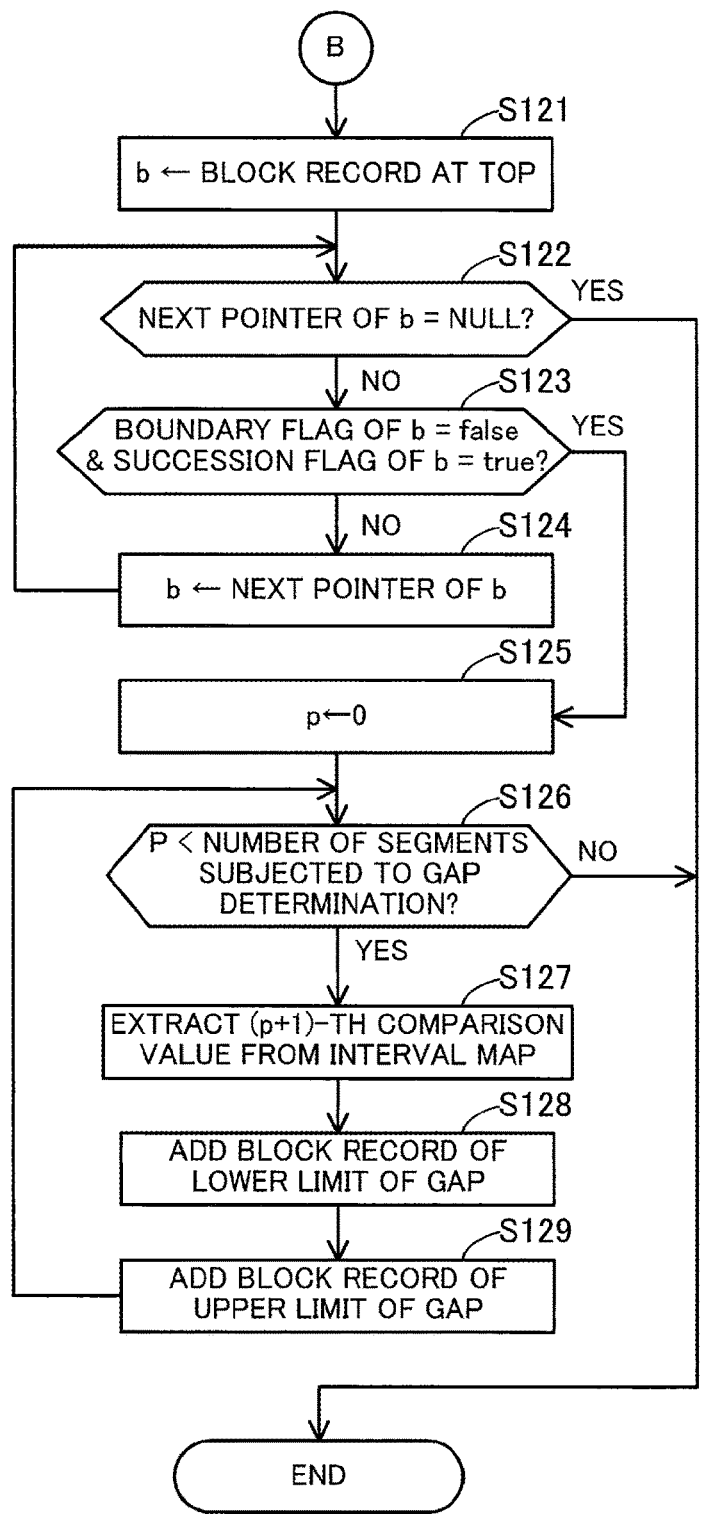
FIG. 18 is a flowchart (continued from FIG. 17) illustrating the example of the procedure of advance determination addition.

FIG. 18 is a flowchart (continued from FIG. 17) illustrating the example of the procedure of advance determination addition.

(S121) The conversion unit 147 selects a block record at the top as a block record b.

(S122) The conversion unit 147 determines whether the next pointer (item #N) of the block record b is NULL. If the next pointer is NULL, the advance determination addition ends. If the next pointer is not NULL, the processing proceeds to step S123.

(S123) The conversion unit 147 determines whether the boundary flag (item #C) of the block record b is false and the succession flag (item #F) is true. If the above condition is satisfied, the processing proceeds to step S125. If not, the processing proceeds to step S124.

(S124) The conversion unit 147 selects a block record pointed to by the next pointer (item #N) of the block record b as a next block record b. Then, the processing returns to step S122.

(S125) The conversion unit 147 assigns 0 to an index p.

(S126) The conversion unit 147 determines whether the index p is less than the number of segments x subjected to a gap determination that is determined in the efficiency evaluation described above. If the index p is less than the number of segments x, the processing proceeds to step S127. Otherwise, the advance determination addition ends.

(S127) The conversion unit 147 extracts a (p+1)-th comparison value from the interval map 154.

(S128) The conversion unit 147 adds a new block record before the block record b. The block record added in this step is a block record of a block that compares the value of the variable c and the lower limit of the gap in the gap determination.

The block name (item #A) is a new label different from the existing labels. The comparison value (item #B) is an integer obtained by adding 1 to the comparison value extracted in step S127. The gap flag (item #D) is true. The boundary flag (item #C), the branch point flag (item #E), and the succession flag (item #F) are false. The true block (item #G) is the block name of the block record immediately following a block record to be added in step S129 (described below). The false block (item #H) is the block name of the block record to be added in step S129. The bl flag (item #I) is true. The bg flag (item #J), the bge flag (item #K), and the ba flag (item #L) are false. The previous pointer (item #M) is the block name of the immediately preceding block record. The next pointer (item #N) is the block name of the block record to be added in step S129. Further, the conversion unit 147 updates the next pointer (item #N) of the immediately preceding block record.

(S129) The conversion unit 147 adds a new block record after the block record added in step S128. The block record added in this step is a block record of a block that compares the value of the variable c and the upper limit of the gap in the gap determination.

The block name (item #A) is a new label different from the existing labels. The comparison value (item #B) is the closest comparison value greater than the comparison value extracted in step S127. The gap flag (item #D) is true. The boundary flag (item #C), the branch point flag (item #E), and the succession flag (item #F) are false. The true block (item #G) is the block name of the last block record. The false block (item #H) is the block name of the immediately succeeding block record. The bl flag (item #I) is true. The bg flag (item #J), the bge flag (item #K), and the ba flag (item #L) are false. The previous pointer (item #M) is the block name of the block record added in step S128. The next pointer (item #N) is the block name of the immediately succeeding block record. The conversion unit 147 updates the previous pointer (item #M) of the immediately succeeding block record. If the number of segments x is greater than or equal to 2, the true block (item #G) is appropriately updated such that gap determinations for two or more segments are successively performed. Then, the processing returns to step S126.

Figure 19:
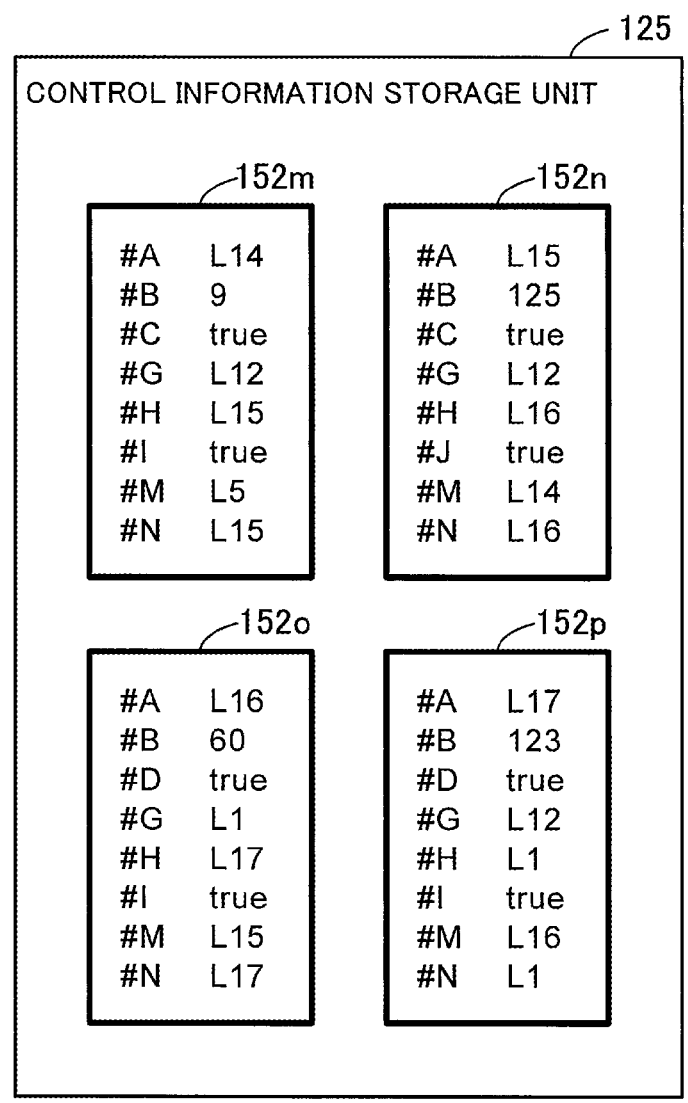
FIG. 19 illustrates a first example of updating block records.

FIG. 19 illustrates a first example of updating block records.

In step S119 described above, a block record 152m is added, for example. The block name (item #A) is a new label L14. The comparison value (item #B) is the minimum comparison value "9". The boundary flag (item #C) is true. The true block (item #G) is L12. The false block (item #H) is L15 indicating a block record 152n. The bl flag (item #I) is true. The previous pointer (item #M) is L5 that is moved to the top. The next pointer (item #N) is L15.

Further, in step S120 described above, the block record 152n is added, for example. The block name (item #A) is a new label L15. The comparison value (item #B) is the maximum comparison value "125". The boundary flag (item #C) is true. The true block (item #G) is L12. The false block (item #H) is L16 indicating a block record 152o. The bg flag (item #J) is true. The previous pointer (item #M) is L14. The next pointer (item #N) is L16. Note that the block records 152m and 152n correspond to the boundary determination 164a.

Further, in step S128 described above, the block record 152o is added, for example. The block name (item #A) is a new label L16. The comparison value (item #B) is "60" which is obtained by adding 1 to the first comparison value of the interval map 154. The gap flag (item #D) is true. The true block (item #G) is L1 indicating the block record 152a following a block record 152p. The false block (item #H) is L17 indicating the block record 152p. The bl flag (item #I) is true. The previous pointer (item #M) is L15. The next pointer (item #N) is L17.

Further, in step S129 described above, the block record 152p is added, for example. The block name (item #A) is a new label L17. The comparison value (item #B) is "123" which is the closest comparison value greater than the first comparison value of the interval map 154. The gap flag (item #D) is true. The true block (item #G) is L12. The false block (item #H) is L1. The bl flag (item #I) is true. The previous pointer (item #M) is L16. The next pointer (item #N) is L1. Note that the block records 152o and 152p correspond to the gap determination 164b.

Figure 20:
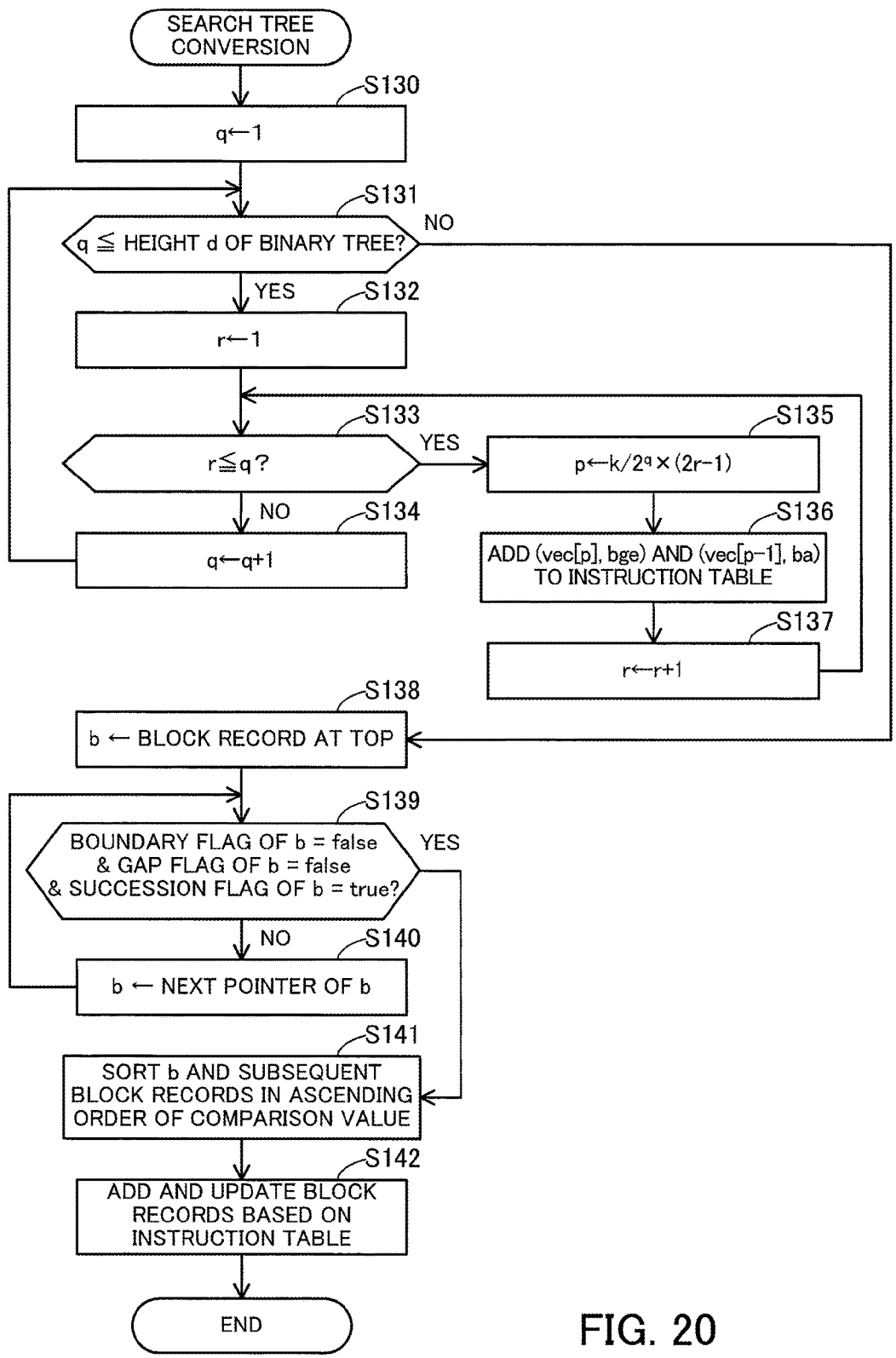
FIG. 20 is a flowchart illustrating an example of the procedure of search tree conversion.

FIG. 20 is a flowchart illustrating an example of the procedure of search tree conversion.

The search tree conversion is performed in step S23 described above.

(S130) The conversion unit 147 assigns 1 to a variable q.

(S131) The conversion unit 147 determines whether the value of the variable q is less than or equal to a height d of the binary tree. The height d may be given in advance or may be determined from the number of comparison values. If the value of the variable q is less than or equal to the height d, the processing proceeds to step S132. If the value of the variable q is greater than the height d, the processing proceeds to step S138.

(S132) The conversion unit 147 assigns 1 to a variable r.

(S133) The conversion unit 147 determines whether the value of the variable r is less than or equal to the value of the variable q. If the value of the variable r is less than or equal to the value of the variable q, the processing proceeds to step S135. If the value of the variable r is greater than the value of the variable q, the processing proceeds to step S134.

(S134) The conversion unit 147 adds 1 to the value of the variable q (increments the variable q). Then, the processing returns to step S131.

(S135) The conversion unit 147 calculates index $p = k/2^q \times (2r-1)$, where k is the number of comparison values, that is, the size of the comparison value vector 153. If the value of the index p obtained by the above equation is a non-integer, the final calculation result is rounded down to the nearest integer. For example, if k=10, q=2, and r=2, then $p=10/4 \times 3 = 30/4 = 7$.

(S136) The conversion unit 147 acquires a comparison value of the index p and a comparison value of an index p−1 from the comparison value vector 153. The conversion unit 147 adds the comparison value of the index p and the bge instruction in association with each other, to the instruction table 155. Further, the conversion unit 147 adds the comparison value of the index p−1 and the ba instruction in association with each other, to the instruction table 155.

(S137) The conversion unit 147 adds 1 to the value of the variable r (increments the variable r). Then, the processing returns to step S133.

(S138) The conversion unit 147 selects a block record at the top as a block record b.

(S139) The conversion unit 147 determines whether the boundary flag (item #C) of the block record b is false; the gap flag (item #D) is false; and the succession flag (item #F) is true. If the above condition is satisfied, the processing proceeds to step S141. If not, the processing proceeds to step S140.

(S140) The conversion unit 147 selects a block record pointed to by the next pointer (item #N) of the block record b as a next block record b. Then, the processing returns to step S139.

(S141) The conversion unit 147 sorts the block record b and the subsequent block records in ascending order of comparison value. For example, in the case of the example of FIG. 7, labels L1 through L11 are sorted in the following order: labels L3, L1, L4, L2, L6, and L7 through L11.

(S142) The conversion unit 147 adds or updates block records based on the instruction table 155. More specifically, the conversion unit 147 retrieves comparison values of the instruction type bge from the instruction table 155, and adds block records corresponding to the respective retrieved comparison values. Each of the block records added in this step is that of a block indicating a branch point determination.

The block name (item #A) is a new label different from the existing labels. The comparison value (item #B) is the comparison value retrieved from the instruction table 155. The branch point flag (item #E) is true. The boundary flag (item #C), the gap flag (item #D), and the succession flag (item #F) are false. The bge flag (item #K) is true. The bl flag (item #I), the bg flag (item #J), and the ba flag (item #L) are false. This block record is inserted at a position where a binary search is implemented. The true block (item #G), the false block (item #H), the previous pointer (item #M), and the next pointer (item #N) are labels appropriately determined based on the insertion position. The label of the false block (item #H) and the label of the next pointer (item #N) are the same.

Further, the conversion unit 147 retrieves comparison values of the instruction type ba from the instruction table 155, and retrieves block records containing the retrieved comparison values. The conversion unit 147 changes the ba flag (item #L) of the retrieved block records. Further, the conversion unit 147 changes the false block (item #H) of the retrieved block records to the label of the last block record.

Figure 21:
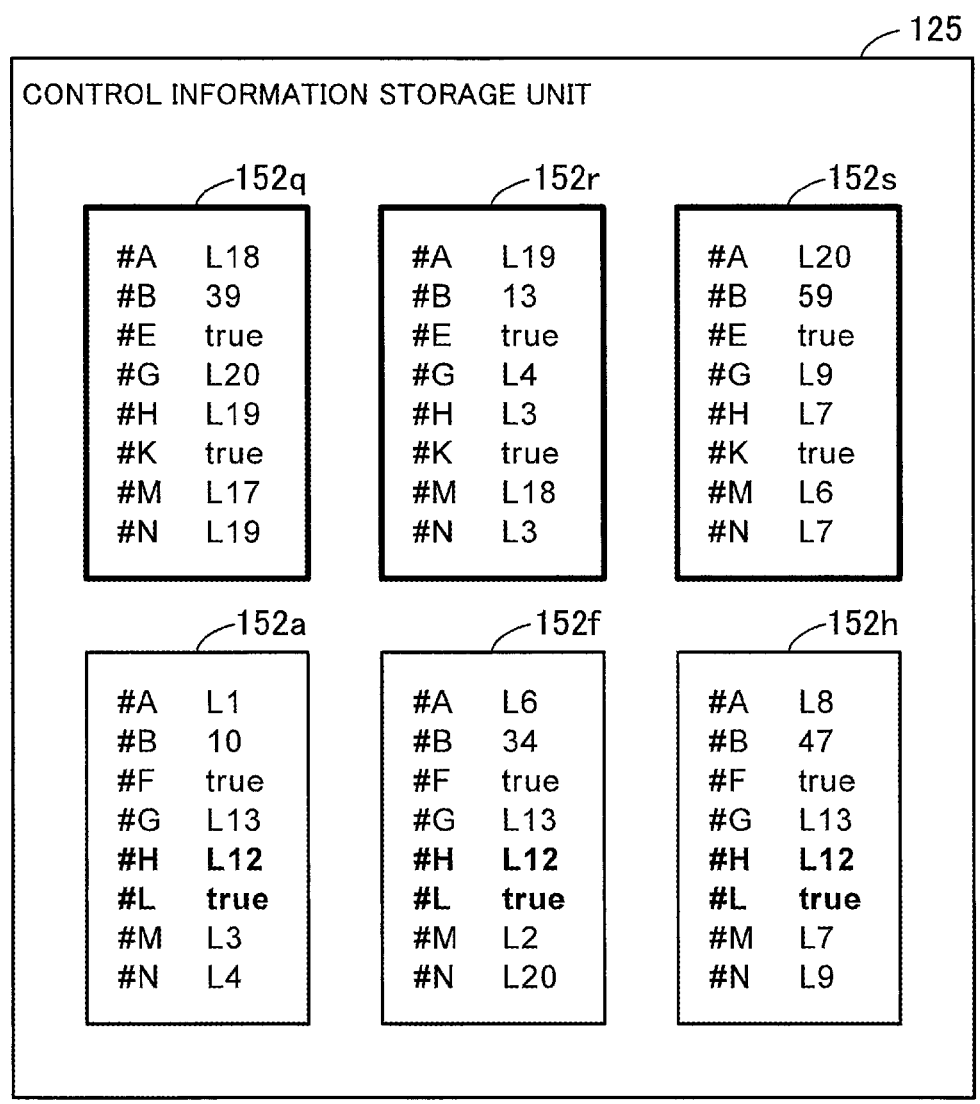
FIG. 21 illustrates a second example of updating block records.

FIG. 21 illustrates a second example of updating block records.

In step S142 described above, block records 152$q$, 152$r$, and 152$s$ are added, for example. The block record 152$q$ corresponds to the comparison value "39" in the instruction table 155, and corresponds to the branch point determination 164$c$. The block record 152$r$ corresponds to the comparison value "13" in the instruction table 155, and corresponds to the branch point determination 164$d$. The block record 152$s$ corresponds to the comparison value "59" in the instruction table 155, and corresponds to the branch point determination 164$e$.

As for the block record 152$q$, the block name (item #A) is a new label L18. The comparison value (item #B) is "39" retrieved from the instruction table 155. The branch point flag (item #E) is true. The true block (item #G) is L20 indicating the block record 152$s$. The false block (item #H) is L19 indicating the block record 152$r$. The bge flag (item #K) is true. The previous pointer (item #M) is L17. The next pointer (item #N) is L19.

As for the block record 152$r$, the block name (item #A) is L19. The comparison value (item #B) is "13" retrieved from the instruction table 155. The branch point flag (item #E) is true. The true block (item #G) is L4. The false block (item #H) is L3. The bge flag (item #K) is true. The previous pointer (item #M) is L18. The next pointer (item #N) is L3.

As for the block record 152$s$, the block name (item #A) is L20. The comparison value (item #B) is "59" retrieved from the instruction table 155. The branch point flag (item #E) is true. The true block (item #G) is L9. The false block (item #H) is L7. The bge flag (item #K) is true. The previous pointer (item #M) is L6. The next pointer (item #N) is L7.

Further, in step S142 described above, the block records 152$a$, 152$f$, and 152$h$ are updated, for example. The false block (item #H) of the block records 152$a$, 152$f$, and 152$h$ are changed to L12. Further, the ba flag (item #L) of the block records 152$a$, 152$f$, and 152$h$ are changed to true. In addition, due to the sorting in step S141, the false block (item #H), the previous pointer (the item #M), and the next pointer (item #N) of each block record are appropriately changed. By tracing the updated series of block records from the end to the top, the code 165 of FIG. 11 is generated, for example.

According to the compiling apparatus 100 of the second embodiment, a control structure is detected in which a variable is compared with a plurality of comparison values and the process branches depending on whether the value of the variable matches any of the comparison values. Then, the detected control structure is converted into another control structure in which a boundary determination, a gap determination, and a branch point determination are inserted before individual determinations for the respective comparison values. In the boundary determination, if the value of the variable is less than the minimum comparison value or greater than the maximum comparison value, the gap determination, the branch point determination, and all the individual determinations are skipped. In the gap determination, if the value of the variable is between two largely distant adjacent comparison values, the branch point determination and all the individual determinations are skipped. In the branch point determination, a search method based on the binary search algorithm is used to skip individual determinations for some of the comparison values.

Accordingly, the average number of comparisons per value of the variable is reduced, making it possible to improve the efficiency of the comparison operations and branch operations. For example, in the case where the comparison values are simply sorted in descending order of probability of being true, if the value of the variable does not match any of the comparison values, the value of the variable is compared with all the comparison values. Further, if the difference in probability of being true is small (the probability does not vary greatly) among the comparison values, it is difficult to reduce the number of comparisons. On the other hand, according to the method of the second embodiment, it is possible to reduce the number of comparisons even when the value of the variable does not match any of the comparison values. Further, the compiling apparatus 100 does not need to calculate the probability that the comparison result is true. Therefore, it is possible to reduce the cost of executing a test run of the object code and the cost of compilation.

Further, since the average number of comparisons per value of the variable is reduced, the number of times a branch instruction is executed is reduced. Furthermore, since the number of times a branch instruction is executed is reduced, it is possible to reduce the cost (penalty) of re-execution due to a branch misprediction. Accordingly, it is possible to improve the execution efficiency of the object code. Further, the number of segments, each defined between two adjacent comparison values, for which a gap determination is performed is determined so as to minimize the number of comparison patterns. Further, a conversion of the control structure is performed only when the number of comparison patterns after the conversion of the control structure is expected to be less than the number of comparison patterns before the conversion. Thus, the number of comparisons during execution is further reduced, making it possible to further improve the efficiency of the comparison operations and branch operations.

As mentioned above, the information processing in the first embodiment may be realized by causing the compiling apparatus 10 to execute a program. Further, the information processing in the second embodiment may be realized by causing the compiling apparatus 100 to execute a program.

Each of the programs may be recorded in a computer-readable storage medium (for example, the storage medium 113). Examples of storage media include magnetic disks, optical discs, magneto-optical disks, semiconductor memories, and the like. Examples of magnetic disks include FD and HDD. Examples of optical discs include CD, CD-Recordable (CD-R), CD-Rewritable (CD-RW), DVD, DVD-R, and DVD-RW. The program may be stored in a portable storage medium and distributed. In this case, the program may be executed after being copied from the portable storage medium to another storage medium such as an HDD or the like (for example, the HDD 103).

According to an aspect, it is possible to reduce the load of a comparison process for a plurality of comparison values.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A compiling apparatus comprising:
a memory configured to store first code that compares a variable with each of three or more comparison values, and performs first branch control when comparison results indicate a match; and
a processor configured to perform a procedure including:
sorting the three or more comparison values to generate a sorted series of comparison values,
determining a minimum comparison value and a maximum comparison value among the sorted series of comparison values,
converting the first code into second code that compares the variable with the minimum comparison value and the maximum comparison value, and performs second branch control without performing comparisons with other comparison values of the three or more comparison values when the variable is less than the minimum comparison value or greater than the maximum comparison value,
generating an interval map that associates an interval between each two adjacent comparison values in the sorted series of comparison values with one or both thereof,
selecting a first comparison value and a second comparison value from the sorted series of comparison values, the second comparison value being adjacent to the first comparison value in the sorted series of comparison values and greater than the first comparison value, the interval map indicates that the first and second comparison values have a largest interval, and
adding more code into the second code to compare the variable with each of the first and second comparison values when the variable is greater than or equal to the minimum comparison value and less than or equal to the maximum comparison value, and to perform the second branch control when the variable is greater than the first comparison value and less than the second comparison value.

2. The compiling apparatus according to claim 1, wherein the procedure further includes evaluating, based on a range of the variable and the three or more comparison values, an efficiency of the branch control that is performed when a determination is made as to whether the value of the variable is greater than the first comparison value and less than the second comparison value, and outputting the second code when a result of the evaluating satisfies a predetermined condition.

3. The compiling apparatus according to claim 1, wherein:
the procedure further includes selecting one comparison value from the three or more comparison values, and sorting an order in which the three or more comparison values are compared in the second code; and
the second code compares the value of the variable with the one comparison value when the value of the variable is greater than or equal to the minimum comparison value and less than or equal to the maximum comparison value, and performs the branch control without performing comparisons with one or more of the three or more comparison values in accordance with a result of comparing the value of the variable with the one comparison value.

4. A compiling method comprising:
detecting, by a processor, an instruction group that compares a variable with each of three or more comparison values, and performs first branch control when comparison results indicate a match, from first code;
sorting the three or more comparison values to generate a sorted series of comparison values,
determining, by the processor, a minimum comparison value and a maximum comparison value among the sorted series of comparison values;
converting, by the processor, the first code into second code that compares the variable with the minimum comparison value and the maximum comparison value, and performs second branch control without performing comparisons with other comparison values of the three or more comparison values when the variable is less than the minimum comparison value or greater than the maximum comparison value,
generating an interval map that associates an interval between each two adjacent comparison values in the sorted series of comparison values with one or both thereof,
selecting a first comparison value and a second comparison value from the sorted series of comparison values, the second comparison value being adjacent to the first comparison value in the sorted series of comparison values and greater than the first comparison value, the interval map indicates that the first and second comparison values have a largest interval, and
adding more code into the second code to compare the variable with each of the first and second comparison values when the variable is greater than or equal to the minimum comparison value and less than or equal to the maximum comparison value, and to perform the second branch control when the variable is greater than the first comparison value and less than the second comparison value.

5. A non-transitory computer-readable storage medium storing a computer program that causes a computer to perform a procedure comprising:

detecting an instruction group that compares a variable with each of three or more comparison values, and performs branch control when comparison results indicate a match, from first code;

sorting the three or more comparison values to generate a sorted series of comparison values, determining a minimum comparison value and a maximum comparison value among the sorted series of comparison values;

converting the first code into second code that compares the variable with the minimum comparison value and the maximum comparison value, and performs second branch control without performing comparisons with other comparison values of the three or more comparison values when the variable is less than the minimum comparison value or greater than the maximum comparison value, generating an interval map that associates an interval between each two adjacent comparison values in the sorted series of comparison values with one or both thereof, selecting a first comparison value and a second comparison value from the sorted series of comparison values, the second comparison value being adjacent to the first comparison value in the sorted series of comparison values and greater than the first comparison value, the interval map indicates that the first and second comparison values have a largest interval, and adding more code into the second code to compare the variable with each of the first and second comparison values when the variable is greater than or equal to the minimum comparison value and less than or equal to the maximum comparison value, and to perform the second branch control when the variable is greater than the first comparison value and less than the second comparison value.

\* \* \* \* \*